(12) United States Patent
Schuster et al.

(10) Patent No.: US 9,803,348 B1
(45) Date of Patent: Oct. 31, 2017

(54) ELECTRICALLY CONTROLLED FLUSH

(75) Inventors: Michael J. Schuster, Joliet, IL (US); Duston E. A. Stutzman, Plainfield, IL (US); Douglas C. Saunders, Plainfield, IL (US)

(73) Assignee: DANCO, INC., Irving, TX (US)

( * ) Notice: Subject to any disclaimer, the term of this patent is extended or adjusted under 35 U.S.C. 154(b) by 1026 days.

(21) Appl. No.: 13/307,809

(22) Filed: Nov. 30, 2011

Related U.S. Application Data

(60) Provisional application No. 61/418,289, filed on Nov. 30, 2010.

(51) Int. Cl.
*E03D 1/14* (2006.01)
*B23P 17/04* (2006.01)

(52) U.S. Cl.
CPC .............. *E03D 1/14* (2013.01); *B23P 17/04* (2013.01)

(58) Field of Classification Search
CPC ......................................... E03D 1/34
USPC ............................. 4/406, 313, 324
See application file for complete search history.

(56) References Cited

U.S. PATENT DOCUMENTS

| | | |
|---|---|---|
| 3,345,649 A | 10/1967 | Cabra |
| 4,154,221 A * | 5/1979 | Nelson ........................... 126/573 |
| 4,305,163 A | 12/1981 | Raz |
| 4,530,119 A | 7/1985 | Chiu et al. |
| 4,733,416 A | 3/1988 | Ott |
| 4,750,220 A | 6/1988 | Baumann |
| 4,969,218 A | 11/1990 | Comparetti |
| 5,117,513 A | 6/1992 | Burrowes |
| 5,140,712 A | 8/1992 | Wang-On |
| 5,301,373 A | 4/1994 | Hull et al. |
| 5,375,268 A | 12/1994 | Chen |
| 5,396,665 A | 3/1995 | Raz et al. |
| 5,491,848 A | 2/1996 | Wang |
| 5,659,903 A | 8/1997 | Hammarstedt |
| 6,163,897 A | 12/2000 | Plas et al. |
| 6,263,520 B1 | 7/2001 | Song |
| 7,062,801 B2 | 6/2006 | Oliver |
| 9,228,333 B1 | 1/2016 | Schuster et al. |
| 2007/0079432 A1* | 4/2007 | Shoikhet et al. ................. 4/406 |
| 2007/0163034 A1 | 7/2007 | Ogen |
| 2010/0132104 A1 | 6/2010 | Csiki |
| 2011/0107506 A1* | 5/2011 | Nasrallah ........................... 4/378 |
| 2011/0167549 A1 | 7/2011 | Schuster et al. |

(Continued)

*Primary Examiner* — Lauren Crane
(74) *Attorney, Agent, or Firm* — Thomas | Horstemeyer LLP; Michael J. D'Aurelio; Randy R. Schoen

(57) ABSTRACT

Various systems and methods are provided for electrically controlled flush applications. In one embodiment, an apparatus includes an activation assembly configured to initiate a flush of a flush assembly based upon a position of the activation assembly. The activation assembly includes a position sensor that senses a transition from a neutral position to a first position and a restraint mechanism that prevents a return to the neutral position for a predefined period of time corresponding to the flush duration. In another embodiment, a flush activation assembly includes an activation control box with a position sensor that provides an indication that a cable anchor has transitioned from a neutral position to a first position to initiate a flush of the flush assembly and a restraint mechanism that prevents the cable anchor from returning to the neutral position in response to the indication from the position sensor.

27 Claims, 24 Drawing Sheets

(56) References Cited

U.S. PATENT DOCUMENTS

2011/0203042 A1    8/2011   Roberts et al.
2013/0191981 A1    8/2013   Schuster et al.

\* cited by examiner

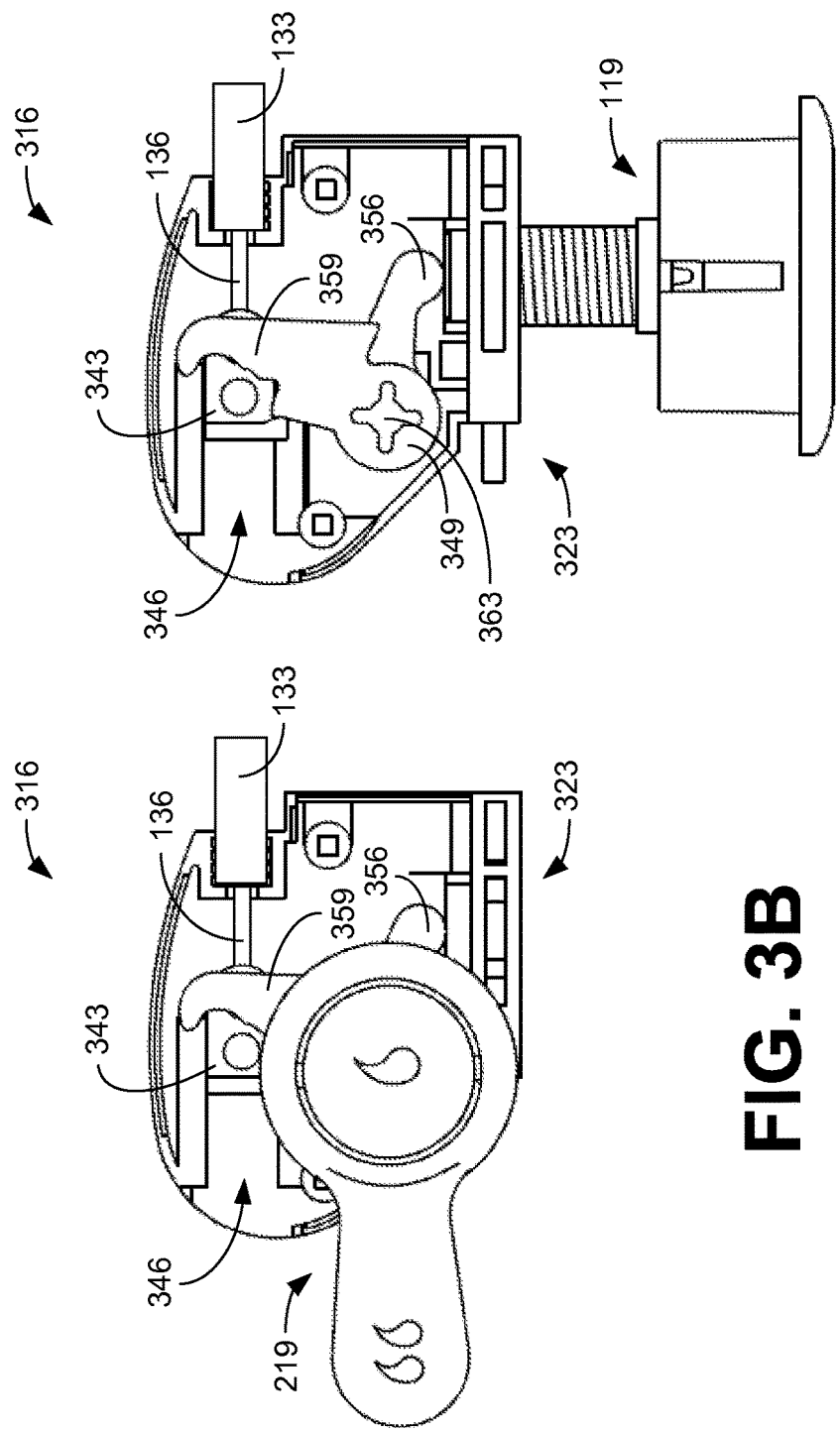

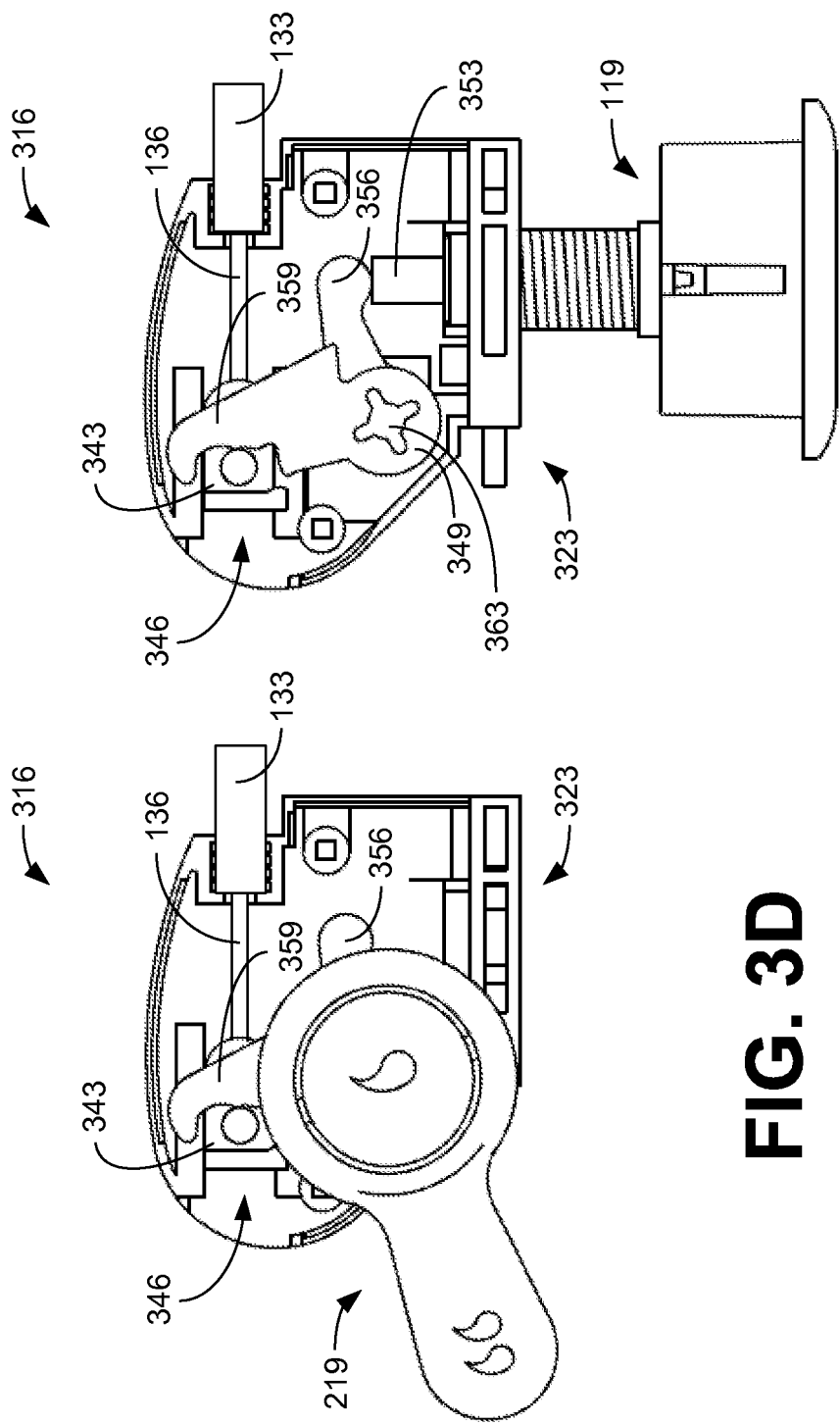

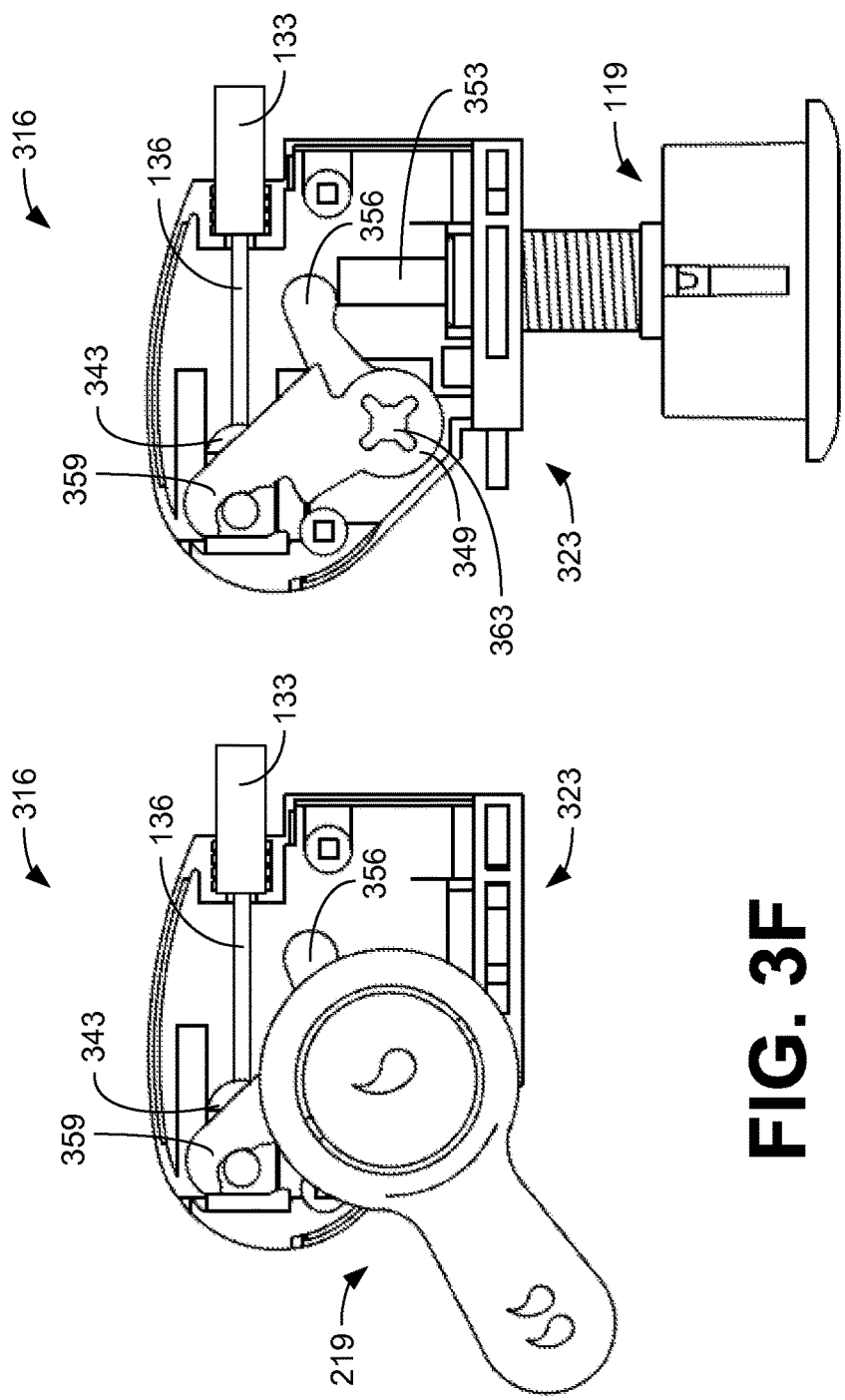

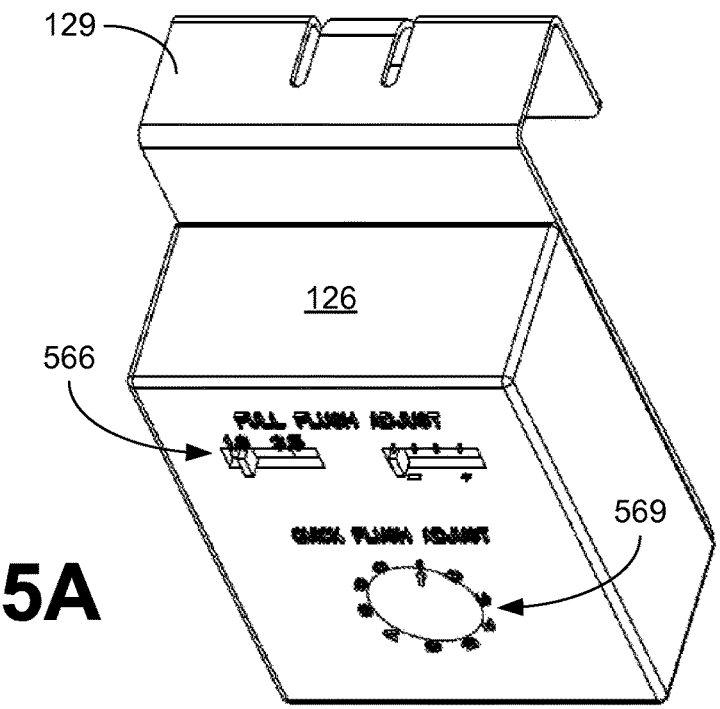
FIG. 5A
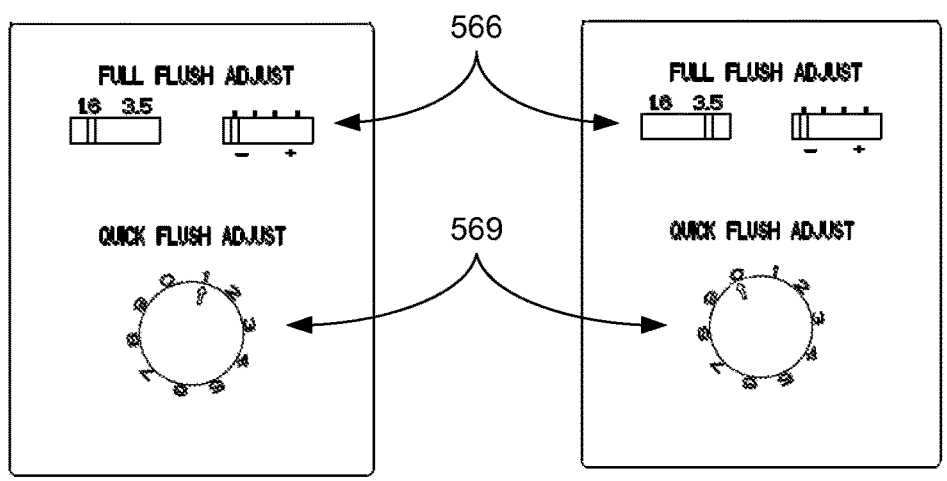
FIG. 5B  FIG. 5C

ELECTRICALLY CONTROLLED FLUSH

CROSS REFERENCE TO RELATED APPLICATIONS

This application claims priority to U.S. provisional application entitled "ELECTRICALLY CONTROLLED DUAL FLUSH" having Ser. No. 61/418,289, filed Nov. 30, 2010, the entirety of which is hereby incorporated by reference.

BACKGROUND

Most toilets in the United States feature a single flush capability that typically uses more water than is needed to flush urine and tissue. This translates into a colossal waste of water each year. Also, typical flush valves that include a flapper preclude the use of other flush technologies without significant effort needed to remove a toilet tank, remove an existing flush valve, and install a new style flush valve, or result in limited fit or function.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3A-3F are drawings that provide various views of an activation assembly of FIG. 1 according to various embodiments of the disclosure.

FIGS. 5A-5C are drawings that provide various views of a flush control box of FIG. 4 according to various embodiments of the disclosure.

DETAILED DESCRIPTION

Figure 1:
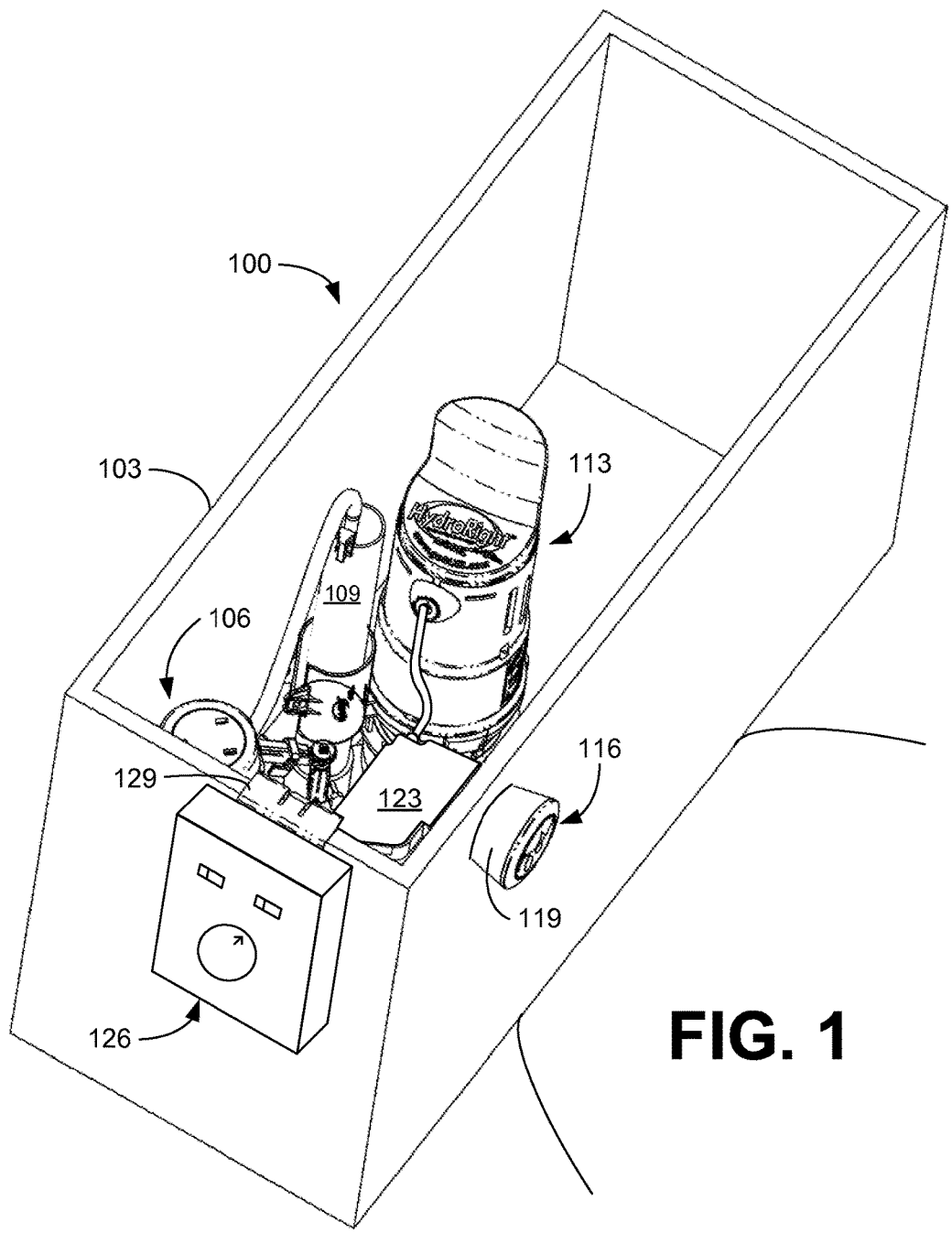
FIG. 1 is a drawing of a toilet including an electrically controlled flush system according to various embodiments of the disclosure.

Disclosed herein are various embodiments of systems and methods related to electrically controlled flush applications. Reference will now be made in detail to the description of the embodiments as illustrated in the drawings, wherein like reference numbers indicate like parts throughout the several views.

Referring to FIG. 1, shown is an example of a toilet 100 including a toilet tank 103 with a fill valve 106. The fill valve 106 controls the filling of the toilet tank 103 by allowing water to enter the toilet tank 103 during the flush cycle of the toilet 100. An overflow tube 109 prevents an overflow of the toilet 100.

The toilet 100 also includes an electrically controlled flush system including, e.g., a dual flush assembly 113 in communication with an activation assembly 116. While the electrically controlled flush system is described with a dual flush assembly 113, the electrically controlled flush system may also be implemented with a single flush assembly or other multi-flush assemblies. The dual flush assembly 113 is secured to the overflow tube 109 of the toilet 100 to hold the dual flush assembly in position. In the embodiment of FIG. 1, the activation assembly 116 includes a push button assembly 119 that is detachably connected to an actuation control box 123. The push button assembly 119 includes buttons that, when depressed, initiate appropriate operation of the dual flush assembly 113. For example, the push button assembly 119 can include a first button for activation of a quick flush mode with a reduced amount of water usage and a second button for activation of a full flush mode using the standard amount of water.

The electrically controlled flush system also includes a flush control for electrically controlling the dual flush operation. The flush control may be contained in a flush control box 126 can be affixed to a wall of the toilet tank 103 by a mounting clip 129 or other appropriate fastener. In other embodiments, the flush control box 126 may be positioned in other locations such as, but not limited to, on a wall, on a counter, or at another location on the toilet 100. In alternate embodiments, the flush control may be integrated into the toilet 100.

Figure 2A:
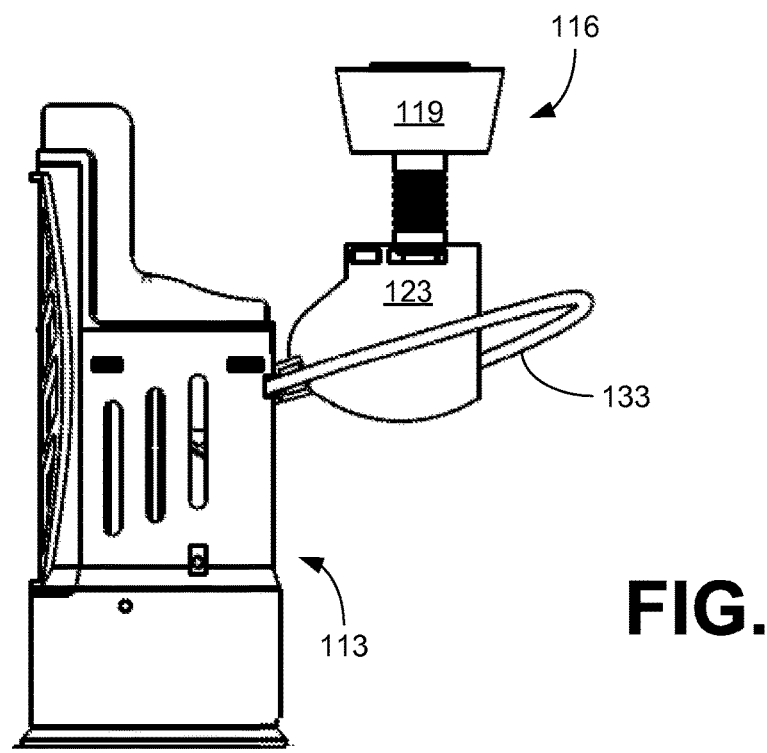
FIGS. 2A and 2B are drawings of a dual flush toilet system with push button activation and rotary handle activation, respectively, of a dual flush assembly of FIG. 1 according to various embodiments of the disclosure.
Figure 2B:
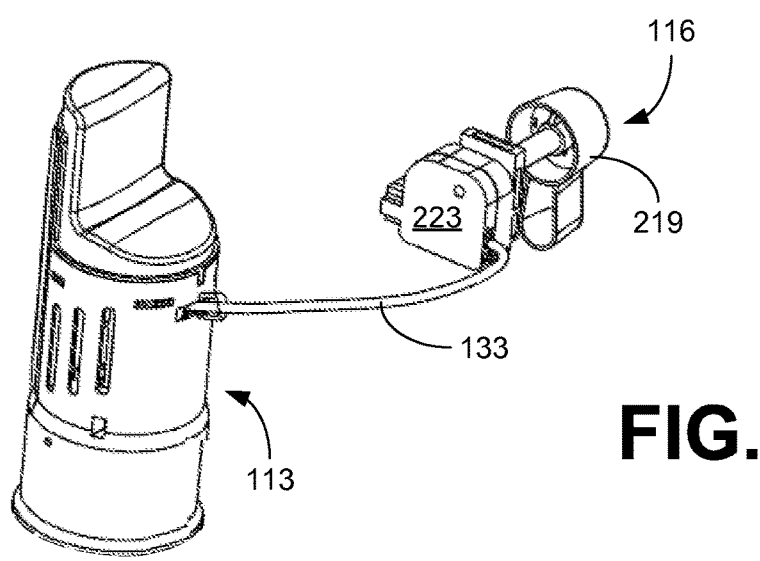

As illustrated in FIGS. 2A and 2B, the activation assembly 116 is in communication with the dual flush assembly 113 through a cable assembly 133, which is connected to the actuation control box 123 and the dual flush assembly 113. In the embodiment of FIG. 2A, the activation assembly 116 includes a push button assembly 119 that is detachably connected to an actuation control box 123. In alternative embodiments, the activation assembly 116 includes a rotary handle assembly 219 that is detachably connected to an actuation control box 223 as illustrated in FIG. 2B, where the actuation control box 223 that is in communication with the dual flush assembly 113. Rotation of the rotary handle assembly 219 to a predetermined position initiates appropriate operation of the dual flush assembly 113. For example, rotation of the rotary handle assembly 219 from a neutral position to an intermediate position activates the quick flush mode and further rotation to a full rotation position initiates the full flush mode.

Next, mechanical operation of an exemplary activation assembly 316 is now discussed with reference to the cut away views of FIGS. 3A-3F. FIGS. 3A, 3C, and 3E depict the actuation control box 323 detachably connected to a push button assembly 119 and FIGS. 3B, 3D, and 3F depict the actuation control box 323 detachably connected to a rotary handle assembly 219. The actuation control box 323 includes a cable anchor 343 that detachably connects one end of a cable 136 of cable assembly 133. Cable anchor 343 is constrained within the actuation control box 316 by a linear guide path 346. The actuation control box 323 also includes an input cam 349 configured to translate activation motion of either the push button assembly 119 or the rotary handle assembly 219 into linear motion of the cable anchor 343, and thus an attached cable 136 in cable assembly 133. The actuation control box 323 is configured to allow the input cam 349 to rotate about a rotational axis that is substantially perpendicular to the linear guide path 346.

FIGS. 3A and 3B illustrate the activation assembly 316 in a neutral position. The actuation control box 323 remains in the neutral position without either a first button for activation of the quick flush mode or a second button for activation of the full flush mode being depressed or without the rotary handle assembly 219 being rotated. With the activation assembly 316 in the neutral position, the cable 136 is retracted in cable assembly 133 and the cable anchor 343 is at a neutral position in the linear guide path 346.

Depressing a button of the push button assembly 119 extends a plunger 353 from the end of the push button assembly 119 into the actuation control box 316. In the exemplary embodiments of FIGS. 3C and 3E, as the plunger 353 extends, the plunger 353 engages plunger arm 356 of the input cam 349 causing the input cam 349 to rotate about the rotational axis. The force provided through the plunger 353 is transferred through the input cam 349 to the cable anchor 343 in the linear guide path 346 by an anchor arm 359. As the cable anchor 343 moves along the linear guide path 346, the cable 136 is drawn from the cable assembly 133 into the actuation control box 316 to initiate a flush of the dual flush assembly 113. Depressing the quick flush button extends the plunger 353 from the end of the push button assembly 119 to an intermediate quick flush position as illustrated in FIG. 3C and depressing the full flush button fully extends the plunger 353 to a full flush position as illustrated in FIG. 3E.

When detachably connected to the actuation control box 316, the rotary handle assembly 219 engages with the input cam 349 at opening 363. Counter clockwise rotation of the rotary handle assembly 219 produces a similar result as discussed above. The torque transferred from the rotary handle assembly 219 to the input cam 349 through opening 363 is exerted on the cable anchor 343 to draw the cable 136 from the cable assembly 133 to initiate a flush of the dual flush assembly 113. FIG. 3D illustrates rotation of the rotary handle assembly 219 to the intermediate quick flush position and FIG. 3G illustrates the rotary handle assembly 219 rotated to the full flush position.

Figure 4:
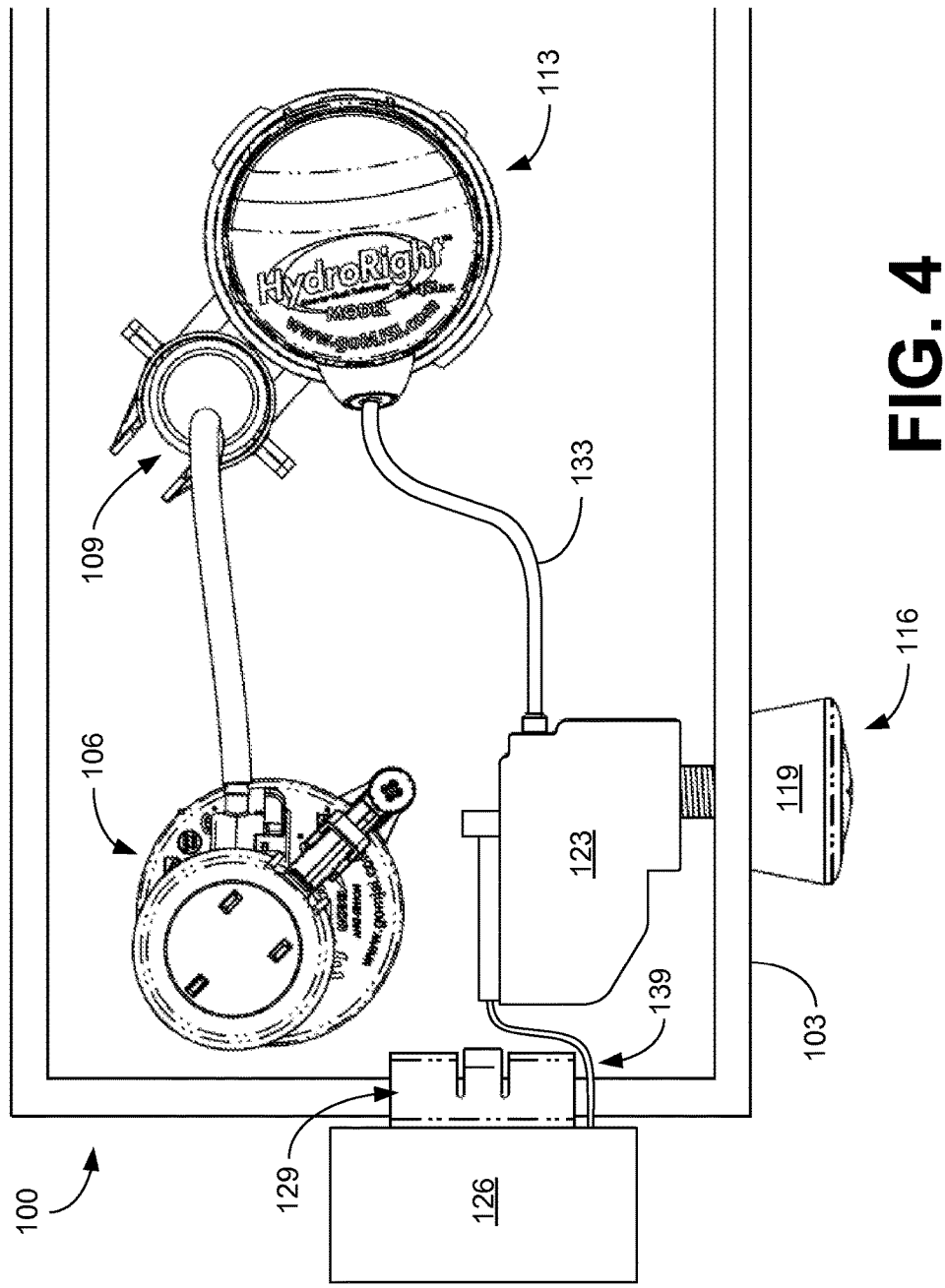
FIG. 4 is a drawing providing a top view of the toilet of FIG. 1 including an embodiment of the electrically controlled flush system according to various embodiments of the disclosure.

Referring now to FIG. 4, shown is a top view of the toilet 100 of FIG. 1 including the electrically controlled flush system. As illustrated in FIGS. 2A and 2B, the activation assembly 116 is in communication with the dual flush assembly 113 through a cable assembly 133, which is connected to the actuation control box 123 and the dual flush assembly 113. The actuation control box 123 is also in communication with the flush control box 126 through an electrical connection 139. In some embodiments, the electrical connection 139 is provided through a wire bundle and an integrated connector. In other embodiments, the electrical connection 139 may be provided by individual connections to various switches, sensors, and/or actuation devices (e.g., solenoids). In alternative embodiments, communication with the actuation control box 123 may be provided through wireless communication.

With respect to FIG. 5A, shown is a perspective of an example of a flush control box 126. The flush control box 126 may include a mounting clip 129 or other appropriate fastener such as, but not limited to, a hook and loop fastener or an adhesive fastener. The flush control box 126 also includes a power supply (e.g., batteries, solar cell, etc.) and flush control circuitry for electrically controlling the dual flush operation. Control of the dual flush operation by the flush control will now be discussed with respect to various embodiments of the actuation control box 123. In the embodiment of FIG. 5A, inputs such as switches and thumb wheels are included on the face of the flush control box 126 for adjustment of the duration of the quick flush and full flush operation. FIGS. 5B and 5C illustrate adjustments of the dual flush operation. For example, adjustment of the full flush flush duration may be set using one or more sliding switches 566 to select the appropriate capacity of the toilet tank 103 (e.g., 1.6 gallons or 3.5 gallons) and/or to fine tune the full flush by increasing (+) or decreasing (−) the flush time. Adjustment of the quick flush duration may be set using a thumb wheel 569 to change between a minimum and maximum flush time.

FIGS. 6A-6D provide various cross-sectional views of an example of an actuation control box 623 of an activation assembly 116 such as that in FIG. 4, which is used to control the dual flush operation. The actuation control box 623 includes a restraint mechanism (e.g., a solenoid plunger 673) and one or more position sensor(s) (e.g., micro switches 676 and 679). In the actuation control box 623 of FIGS. 6A-6D, a push button assembly 119 (FIG. 3A) or a rotary handle assembly 219 (FIG. 3B) of the activation assembly 116 as well as the input cam (e.g., 349 of FIGS. 3A-3F) are not depicted to aid in illustration of the operation of the actuation control box 623. Beginning with FIG. 6A, the activation assembly 116 is in a neutral position without depressing a button of the push button assembly 119 or rotating the rotary handle assembly 219. In the neutral position of FIG. 6A, the cable 136 is retracted in cable assembly 133 and the cable anchor 643 is at a neutral position in the linear guide path 646 of the actuation control box 623.

Figure 6A:
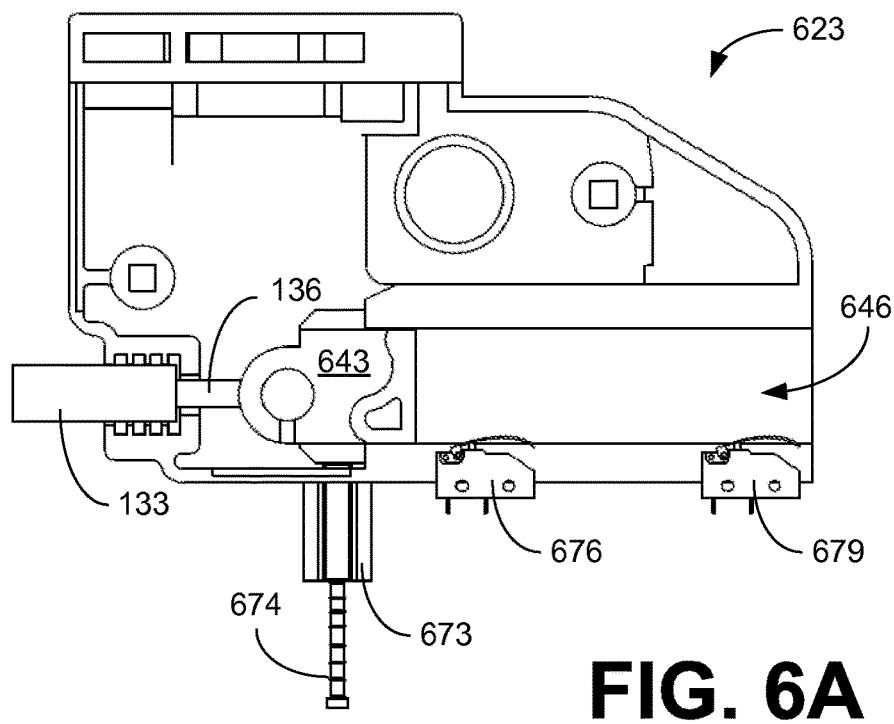
FIGS. 6A-6D and 8A-15C are drawings that provide various views of examples of actuation control boxes of FIG. 4 according to various embodiments of the disclosure.
Figure 6B:
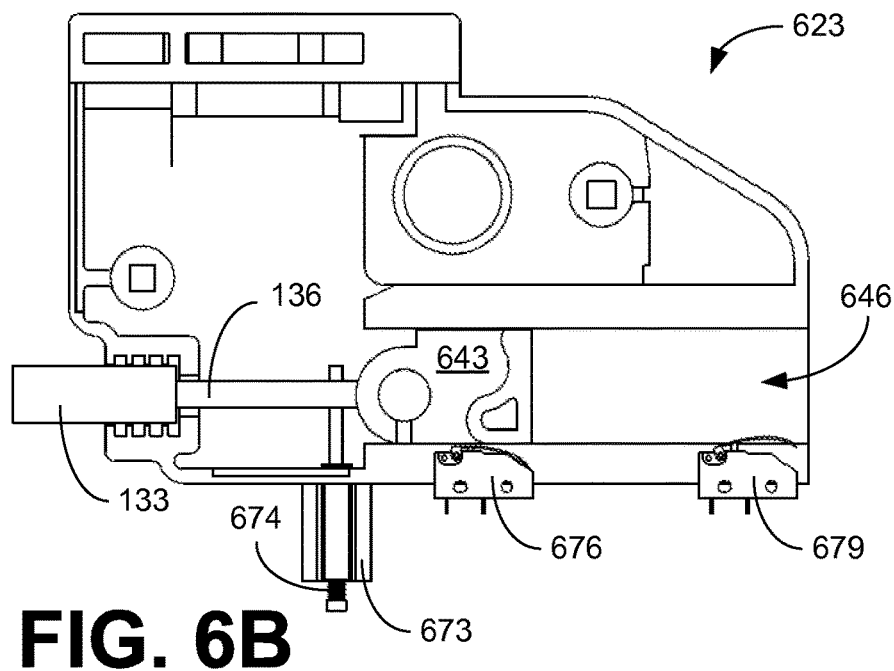

Referring next to FIG. 6B, depressing a button of the push button assembly 119 or rotation the rotary handle assembly 219 causes the cable anchor 643 to move in the linear guide path 646 to retract the cable 136 into the actuation control box 623. As the cable anchor 643 reaches an intermediate position, as illustrated in FIG. 6B, a first position sensor detects that position of the cable anchor 643. For example, in FIG. 6B, the cable anchor 643 engages the first micro switch 676, thereby closing (or opening) the micro switch 676 to indicate initiation of a quick flush. In response to the indication provided by the micro switch 676, a restraint mechanism (e.g., the solenoid plunger 673) holds the cable anchor in the intermediate position, preventing the cable anchor 643 from returning to the neutral position of FIG. 6A. In FIG. 6B, the solenoid plunger 673 extends into the actuation control box 623 to restrain movement of the cable anchor 643 back to the neutral position. The solenoid plunger 673 can include a spring 674 that returns the plunger to its retracted position. Operation of the restraint mechanism may be controlled by the circuitry for controlling the dual flush operation. For example, the circuitry may energize the solenoid plunger 673 to extend the plunger into the actuation control box 623 in response to the indication provided by the micro switch 676.

The indication provided by the first position sensor (e.g., micro switch 676) also initiates a timer of the flush control. If a quick flush is initiated by depressing the quick flush button of the push button assembly 119 or by rotating the rotary handle assembly 219 to the intermediate quick flush position, then the cable anchor 643 is restrained from returning to the neutral position for a period of time corresponding to a quick flush of the toilet 100. When the quick flush time period has expired, the flush control allows the plunger of the plunger solenoid 673 to retract from the actuation control box 623, thereby allowing the cable anchor 643 to return to the neutral position of FIG. 6A and ending the flush cycle of the toilet.

Figure 6C:
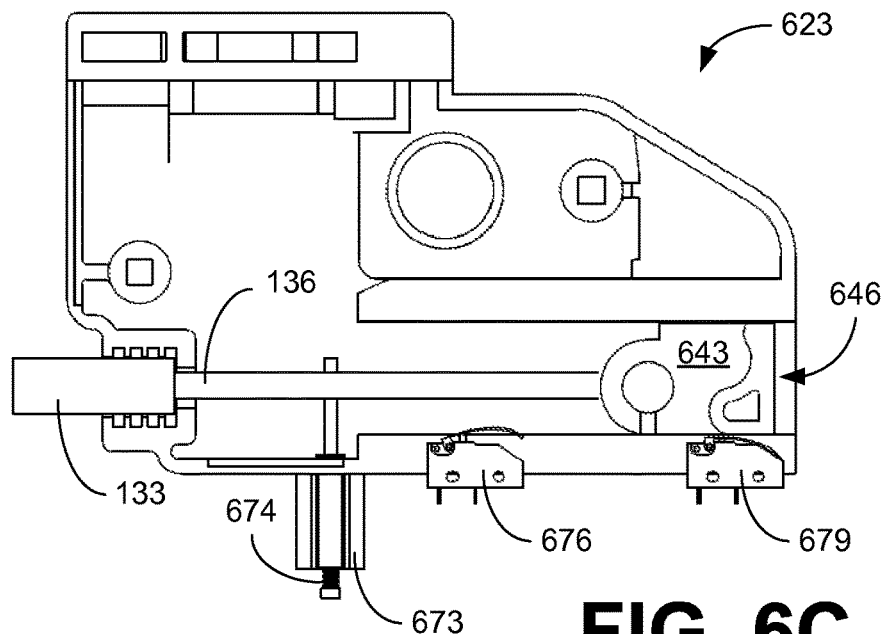

If the full flush button of the push button assembly 119 is depressed or the rotary handle assembly 219 is rotated to the full flush position, the cable anchor 643 continues moving along the linear guide path 646 further retracting the cable 136 into the actuation control box 623. When the cable anchor 643 reaches the full flush position, as illustrated in FIG. 6C, a second position sensor detects that position of the cable anchor 643. For example, the cable anchor 643 may engage the second micro switch 679 of FIG. 6C, thereby closing (or opening) the micro switch 679 to indicate initiation of a full flush. In response to the indication provided by the micro switch 679, the flush control extends the time period to a time corresponding to a full flush of the toilet 100. Upon release of the button or rotary handle, the cable anchor 643 is allowed to return to the intermediate position but is restrained from returning to the neutral position for the period of time corresponding to a full flush of the toilet 100. When the extended time period has expired, the flush control allows the plunger of the plunger solenoid 673 to retract from the actuation control box 623, thereby allowing the cable anchor 643 to return to the neutral position of FIG. 6A and end the flush cycle of the toilet.

Figure 6D:
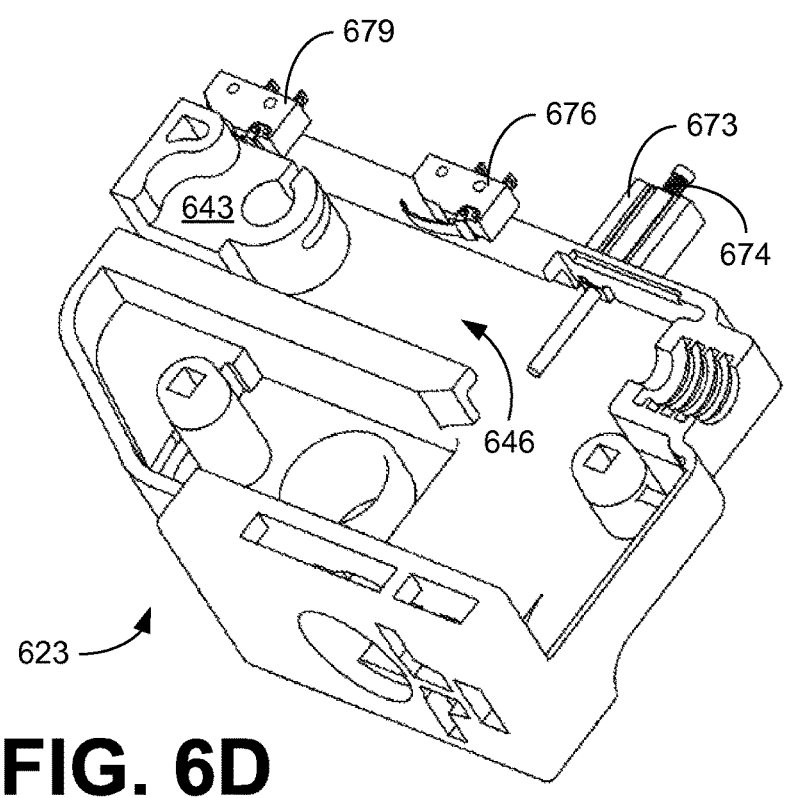

FIG. 6D provides a perspective cross-sectional view of the actuation control box 623 with the cable anchor 643 in the full flush position and the plunger of the plunger solenoid 673 extended to restrain the cable anchor 643. The cable assembly 133 with cable 136 is not shown in FIG. 6D for clarity. If the flush control fails to operate the restraint mechanism (e.g., if the batteries cannot supply power), then the activation assembly 116 can be operated to manually flush the toilet 100 by depressing and holding a button of the push button assembly 119 or by holding the rotary handle assembly 219 in a rotated position for a desired period of time.

Figure 7A:
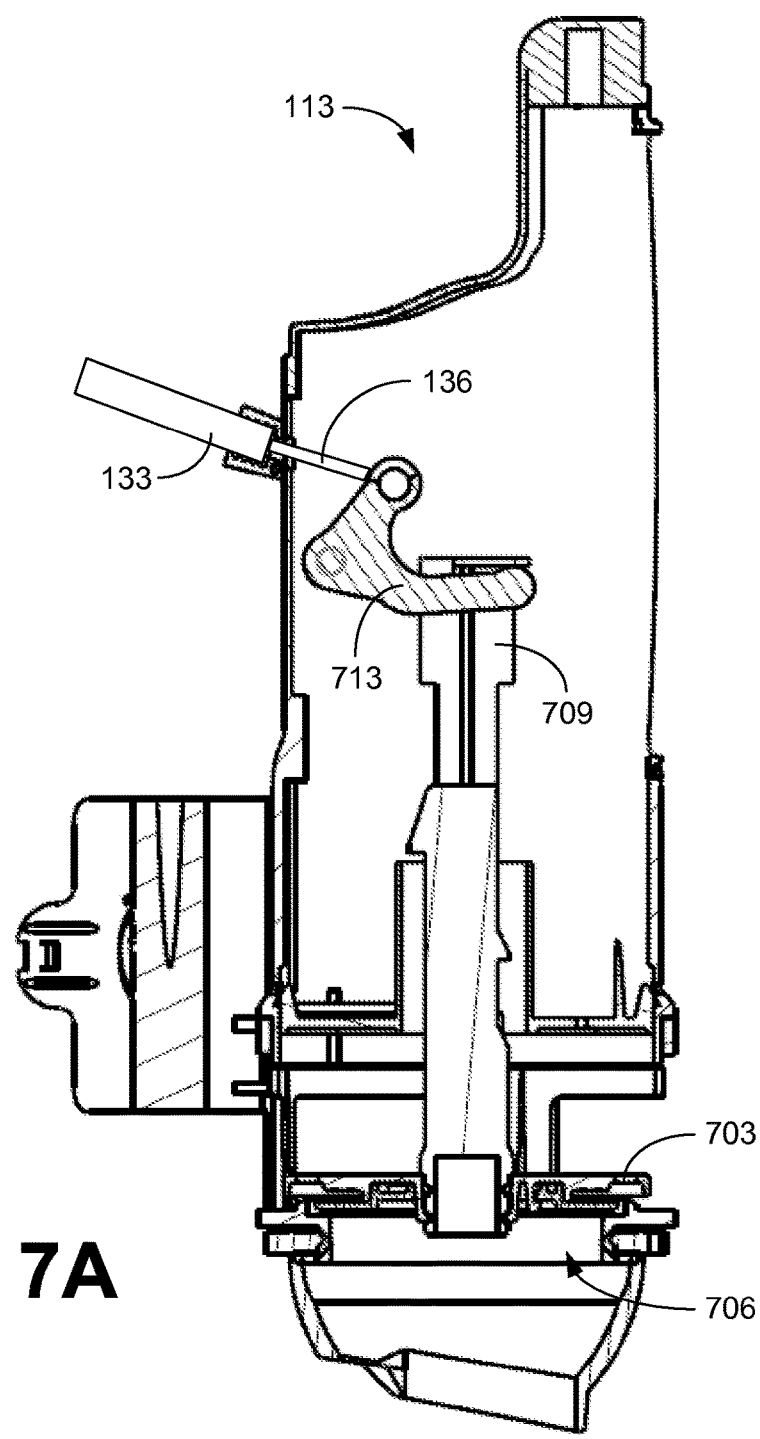
FIGS. 7A-B are drawings that provide various views of a dual flush assembly of FIG. 4 according to various embodiments of the disclosure.
Figure 7B:
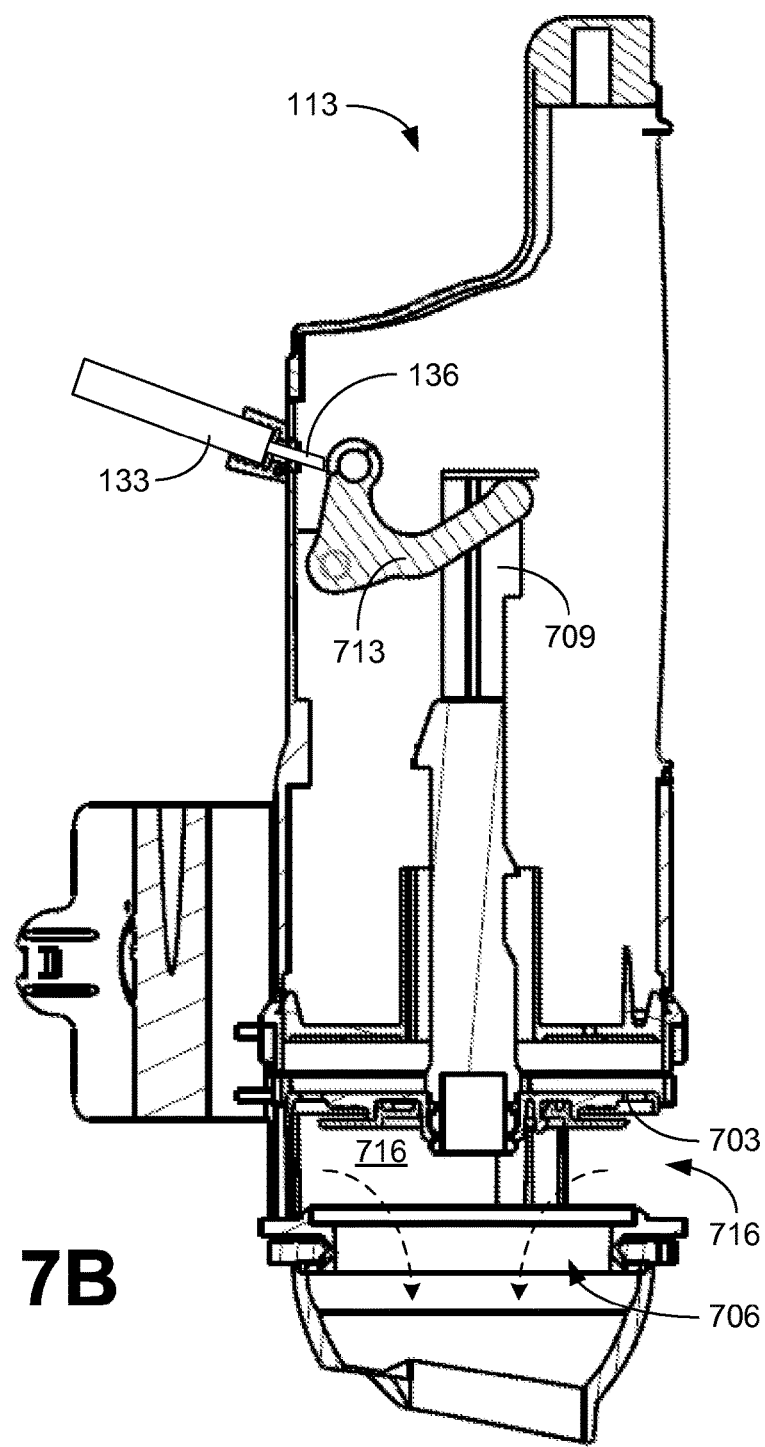

Referring now to FIGS. 7A and 7B, operation of the dual flush assembly 113 with respect to the activation assembly 116 is now discussed. The dual flush assembly includes a sealing member 703 configured to seal a flush orifice 706 of the dual flush assembly 113 when the activation assembly 116 is in the neutral position as illustrated in FIG. 7A. A flush is initiated when mechanisms in the dual flush assembly 113 lift the sealing member 703 to allow water to flow into the flush orifice 706 and through the flush valve to a toilet bowl. In the embodiment of FIGS. 7A and 7B, the mechanisms include a lifting element 709 secured to the sealing member 703 and a flush lever 713 detachably connected to the cable 136 of cable assembly 133 and in communication with the lifting element 709. In other embodiments, the dual flush assembly 113 may not include the flush lever 713. Rather, the cable 136 may be in direct communication with the lifting element 709. For example, the cable 136 may be routed through the top of the dual flush assembly 113 and detachably connected to the top of the lifting element 709. In other arrangements, the cable 136 may be routed from the side of the dual flush assembly 113, over a pulley or guide, and detachably connected to the top of the lifting element 709. While FIGS. 7A-7B illustrate a plunger style sealing member 703, other embodiments can include a flapper style sealing member where the sealing member is mounted on a tilt system that allows the seal to be pulled off on an angle.

Without depressing and holding a button of the push button assembly 119 or by rotating the rotary handle assembly 219, the activation assembly 116 remains in a neutral position (e.g., as illustrated by the actuation control box 623 in FIG. 6A) allowing the cable 136 to extend into the dual flush assembly 113. With the cable 136 extended into the dual flush assembly 113, the sealing member 703 seals the flush orifice 706. Depressing a button of the push button assembly 119 or rotation the rotary handle assembly 219 to initiate a flush retracts cable 136 into the actuation control box (e.g., as illustrated in FIGS. 6B-6C). As cable 136 is retracted, the flush lever 713 pivots to apply pressure to the top of the lifting element 709 and lift the sealing member 703 from the flush orifice 706. The sides of the dual flush assembly 113 include water flow openings 716 that allow water to enter and flow through the flush orifice 706 into the toilet bowl as the sealing member 703 is lifted.

Water continues to flow through the flush orifice 706 until the restraint mechanism of the actuation control box allows the sealing member 703 to descend and reseal the flush orifice 706 as depicted in FIG. 7A. The restraint mechanism of the actuation control box (e.g., the plunger solenoid 673 in the actuation control box 623 of FIGS. 6A-6D) prevents the dual flush assembly 113 from returning to the neutral position until the corresponding flush time has passed. For example, if a quick flush is initiated by depressing the quick flush button of the push button assembly 119 or by rotating the rotary handle assembly 219 to the intermediate quick flush position, then the cable anchor 643 is restrained from returning to the neutral position by the plunger of the plunger solenoid 673 (e.g., as illustrated in FIG. 6B) for a period of time corresponding to a quick flush of the toilet 100.

If the rotary handle assembly 219 is fully rotated or the full flush button of the push button assembly 119 is depressed, then the time is extended to a period corresponding to a full flush of the toilet 100. Full rotation of the rotary handle assembly 219 or fully depressing the full flush button of the push button assembly 119 fully retracts the cable 136 into the actuation control box (e.g., as illustrated in FIG. 6C), lifting the sealing member 703 as illustrated in FIG. 7B. When the push button assembly 119 or the rotary handle assembly 219 is released after initiation of the full flush, the cable anchor 643 is allowed to return to the intermediate position of FIG. 6B but is prevented from returning to the neutral position of FIG. 6A by the restraint mechanism until the full flush time period has passed.

Referring next to FIGS. 8A-8D, shown are various cross-sectional views of another example of an actuation control box 823 of an activation assembly 116 of FIG. 4 including different position sensors. The actuation control box 623 includes a restraint mechanism (e.g., a solenoid plunger 873) and position sensors (e.g., sensors 876 and 879) such as, but not limited to, capacitive or magnetic sensors. Beginning with FIG. 8A, the activation assembly 116 is in a neutral position with the cable 136 retracted in cable assembly 133 and the cable anchor 843 at a neutral position in the linear guide path 846. In this condition, the sealing member 703 of the dual flush assembly 113 seals the flush orifice 706 of the dual flush assembly 113 as illustrated in FIG. 7A.

Figure 8A:
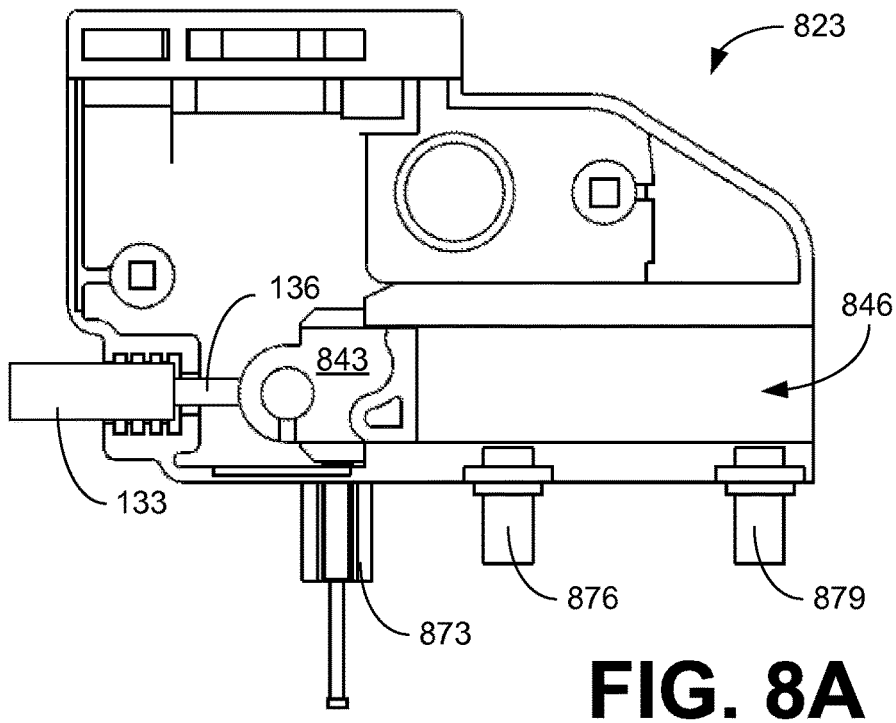
Figure 8B:
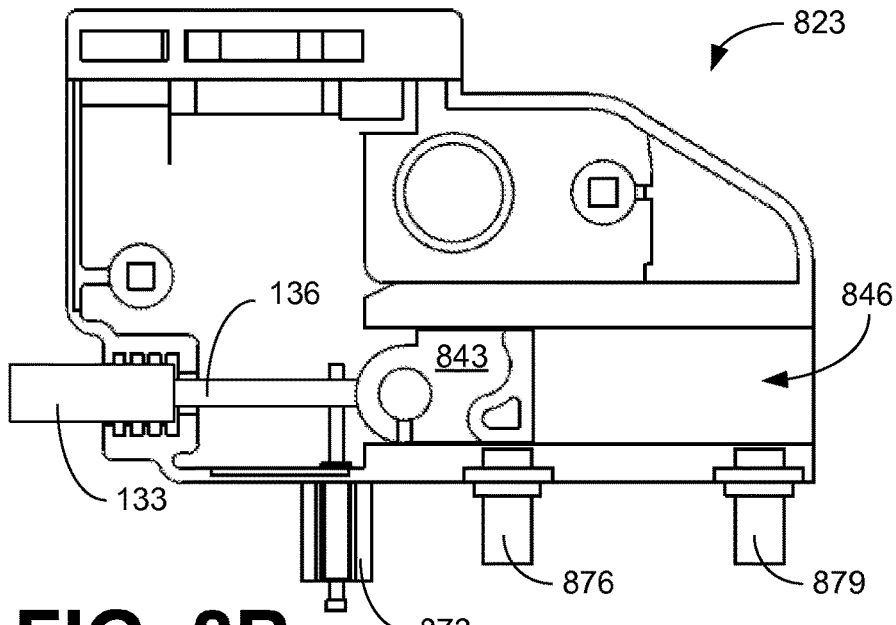

Using the activation assembly 116 to initiate a flush causes the cable anchor 843 to move in the linear guide path 846 to retract the cable 136 into the actuation control box 823. Retraction of the cable 136 lifts the sealing member 703 to allow water to flow through the flush orifice 706 of FIGS. 7A and 7B. As the cable anchor 843 reaches the intermediate position, as illustrated in FIG. 8B, a first position sensor detects that position of the cable anchor 843. In the embodiment of FIGS. 8A-8D, a raised portion of the cable anchor 843 aligns with the first sensor 876 to indicate initiation of a quick flush. The alignment may cause, for example, a change in the sensor capacitance or may magnetically close a switch in the sensor 876. In response to the indication provided by the first position sensor 876, the restraint mechanism (e.g., the solenoid plunger 873) holds the cable anchor 843 in the intermediate position, preventing the cable anchor 843 from returning to the neutral position of FIG. 8A. In FIG. 8B, the solenoid plunger 873 extends a plunger into the actuation control box 823 to restrain movement of the cable anchor 843 back to the neutral position until the flush is completed. As discussed with respect to FIG. 6B, the indication provided by the first position sensor (e.g., sensor 876) also initiates the timer of the flush control. When the quick flush time period has expired, the flush control allows the plunger of the plunger solenoid 873 to retract from the actuation control box 823, thereby allowing the cable anchor 843 to return to the neutral position of FIG. 8A and the sealing member 703 to reseal the flush orifice 706 as depicted in FIG. 7A, thereby ending the flush cycle of the toilet.

Figure 8C:
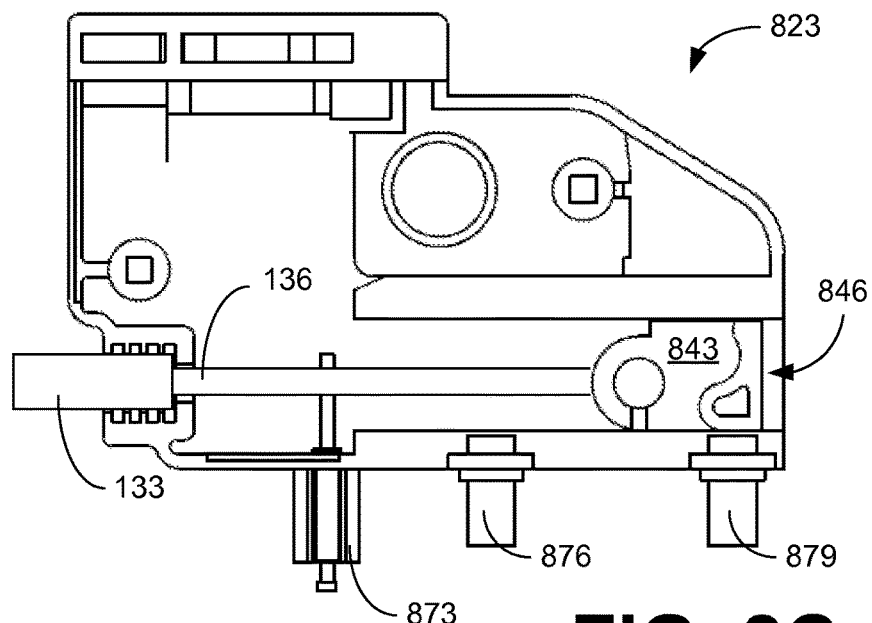

If a full flush is initiated, the cable anchor 843 continues moving along the linear guide path 846 further retracting the cable 136 into the actuation control box 823 and lifting the sealing member 703 of the dual flush assembly 113 as illustrated in FIG. 7B. When the cable anchor 843 reaches the full flush position, as illustrated in FIG. 8C, a second position sensor detects that position of the cable anchor 843. Similar to the first position sensor 876, the raised portion of the cable anchor 843 aligns with the second sensor 879 to indicate initiation of a full flush. In response to the indication provided by the second sensor 879, the flush control extends the time period to a time corresponding to a full flush of the toilet 100. Upon release of the button or rotary handle, the cable anchor 843 is allowed to return to the intermediate position but is restrained from returning to the neutral position for the period of time corresponding to a full flush of the toilet 100. When the extended time period has expired, the flush control allows the plunger of the plunger solenoid 873 to retract from the actuation control box 823, thereby allowing the cable anchor 843 to return to the neutral position of FIG. 8A resealing the flush orifice 706 as depicted in FIG. 7A and ending the flush cycle.

Figure 8D:
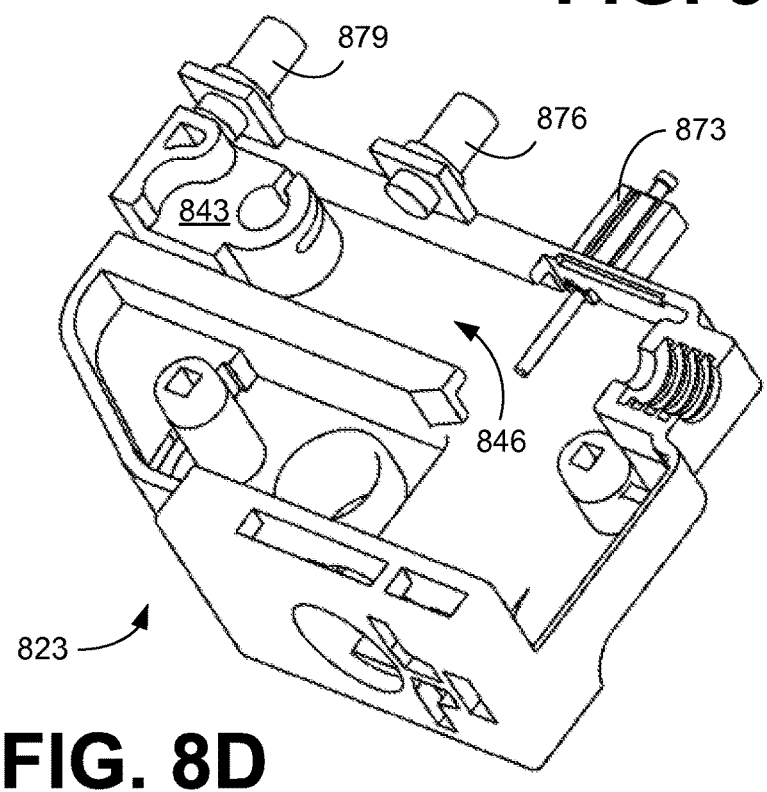

FIG. 8D provides a perspective cross-sectional view of the actuation control box 823 with the cable anchor 843 in the full flush position with the raised portion of the cable anchor aligned with the second sensor 879. The plunger of the plunger solenoid 873 is extended to prevent the cable anchor 843 from returning to the neutral position until the full flush cycle is complete. The cable assembly 133 with cable 136 is not shown in FIG. 8D for clarity.

Referring now to FIGS. 9A-9D, shown are various cross-sectional views of another example of an actuation control box 923 of an activation assembly 116 of FIG. 4 including different restraint mechanisms. The actuation control box 623 includes restraint mechanisms (e.g., solenoid plungers 973a and 973b) and position sensors (e.g., micro switches 976 and 979). Beginning with FIG. 9A, the activation assembly 116 is in a neutral position with the cable 136 retracted in cable assembly 133 and the cable anchor 943 at a neutral position in the linear guide path 946. In this condition, the sealing member 703 of the dual flush assembly 113 seals the flush orifice 706 of the dual flush assembly 113 as illustrated in FIG. 7A.

Figure 9A:
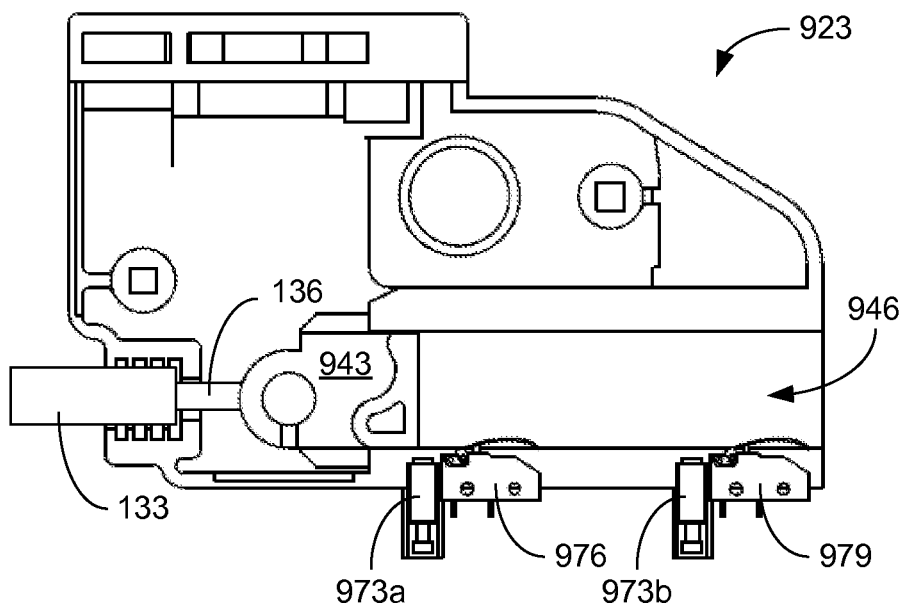
Figure 9B:
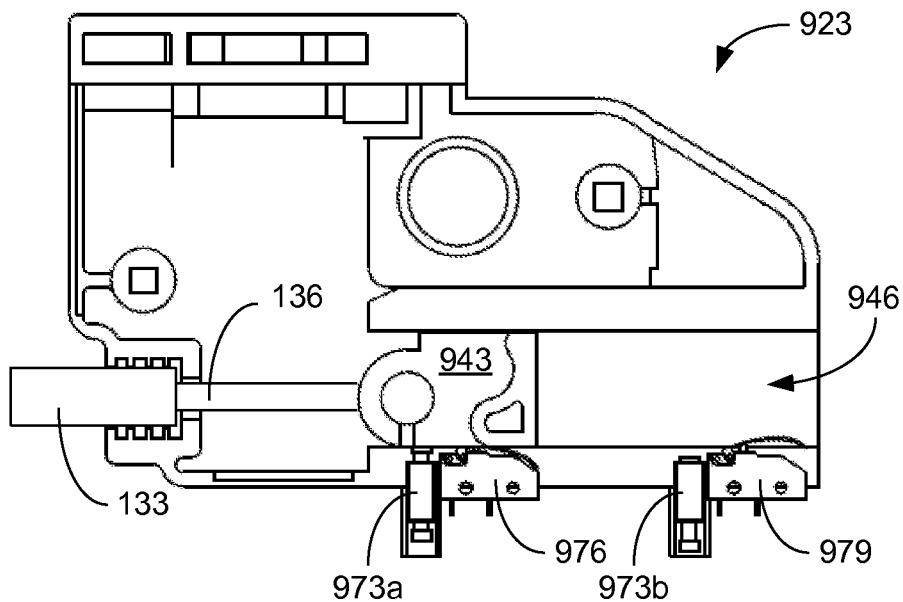

Using the activation assembly 116 to initiate a flush causes the cable anchor 943 to move in the linear guide path 946 to retract the cable 136 into the actuation control box 923. Retraction of the cable 136 lifts the sealing member 703 to allow water to flow through the flush orifice 706 of FIGS. 7A and 7B. As the cable anchor 943 reaches the intermediate position, as illustrated in FIG. 9B, a first position sensor detects that position of the cable anchor 943. For example, in FIG. 9B, the cable anchor 943 engages the first micro switch 976, thereby closing (or opening) the micro switch 976 to indicate initiation of a quick flush. In response to the indication provided by the first position sensor 976, the restraint mechanism (e.g., solenoid plunger 973a) holds the cable anchor 943 in the intermediate position, preventing the cable anchor 943 from returning to the neutral position of FIG. 9A. In the embodiment of FIG. 9B, the solenoid plunger 973a extends a plunger that engages with the cable anchor 943 to restrain movement back to the neutral position until the flush is completed. The solenoid plunger 973a does not limit further travel of the cable anchor 943 towards the full flush position. As discussed with respect to FIG. 6B, the indication provided by the first position sensor (e.g., micro switch 976) also initiates the timer of the flush control. When the quick flush time period has expired, the flush control allows the plunger solenoid 973a to disengage with the cable anchor 943. The retraction of the plunger solenoid 973a allows the cable anchor 943 to return to the neutral position of FIG. 9A and the sealing member 703 to reseal the flush orifice 706 as depicted in FIG. 7A, thereby ending the flush cycle of the toilet.

Figure 9C:
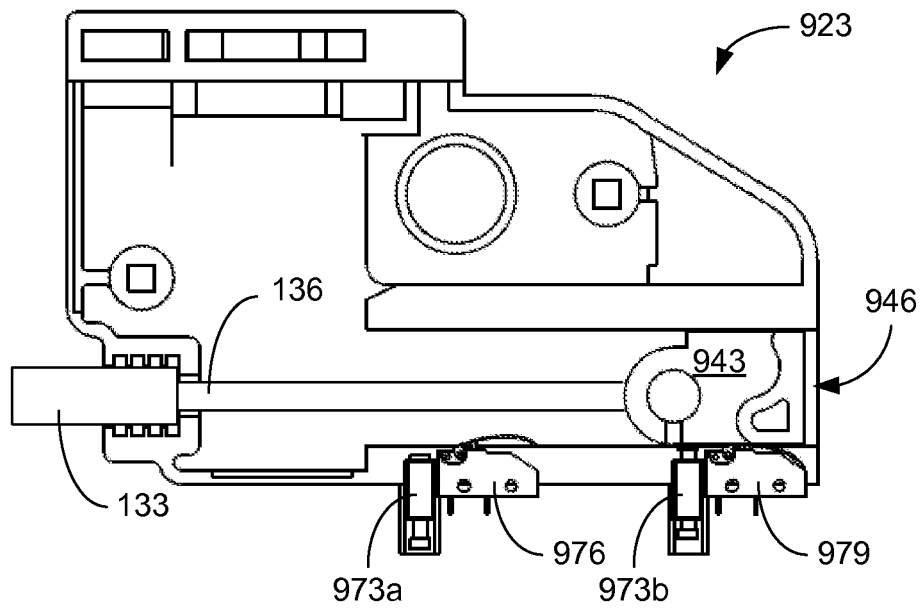

If a full flush is initiated, the cable anchor 943 continues moving along the linear guide path 946 further retracting the cable 136 into the actuation control box 923 and lifting the sealing member 703 of the dual flush assembly 113 as illustrated in FIG. 7B. When the cable anchor 943 reaches the full flush position, as illustrated in FIG. 9C, a second position sensor detects that position of the cable anchor 943. For example, the cable anchor 943 may engage the second micro switch 979 of FIG. 9C, thereby closing (or opening) the micro switch 979 to indicate initiation of a full flush. For example, in FIG. 9C, the cable anchor 949 engages the second micro switch 979, thereby closing (or opening) the micro switch 979 to indicate initiation of a full flush. In response to the indication provided by the second position sensor 979, the other restraint mechanism (e.g., solenoid plunger 973b) holds the cable anchor 943 in the full flush position, preventing the cable anchor 943 from returning to the neutral position of FIG. 9A. Also, in response to the indication provided by the second position sensor 979, the flush control extends the time period to a time corresponding to a full flush of the toilet 100. In some embodiments, the indication from the second position sensor 979 allows the first plunger solenoid 973a to retract while the second plunger solenoid 973b to is extended to hold the cable anchor 943 in position.

When the extended time period has expired, the flush control allows the plunger solenoid 973b to disengage with the cable anchor 943. The retraction of the plunger solenoid 973b allows the cable anchor 943 to return to the neutral position of FIG. 9A and the sealing member 703 to reseal the flush orifice 706 as depicted in FIG. 7A, thereby ending the flush cycle of the toilet.

Figure 9D:
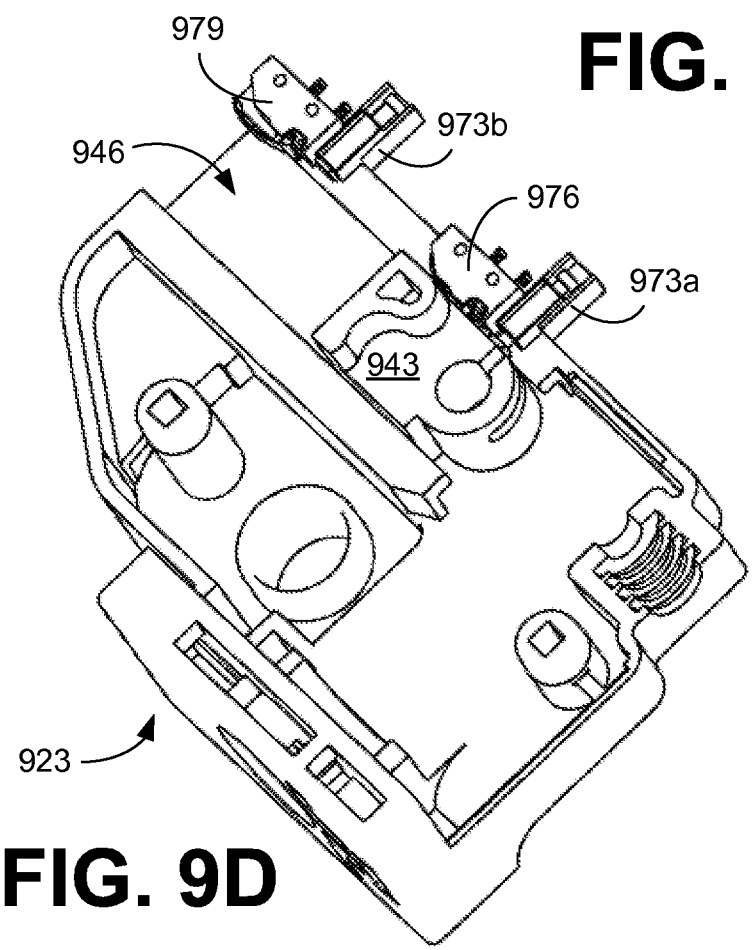

FIG. 9D provides a perspective cross-sectional view of the actuation control box 923 with the cable anchor 943 in the quick flush position with the plunger solenoid 973a extended to prevent the cable anchor 943 from returning to the neutral position until the flush cycle is complete. The cable assembly 133 with cable 136 is not shown in FIG. 9D for clarity. If the flush control fails to operate the restraint mechanism (e.g., if the batteries cannot supply power), then the activation assembly 116 can be operated to manually flush the toilet 100 by depressing and holding a button of the push button assembly 119 or by holding the rotary handle assembly 219 in a rotated position for a desired period of time.

Figure 10A:
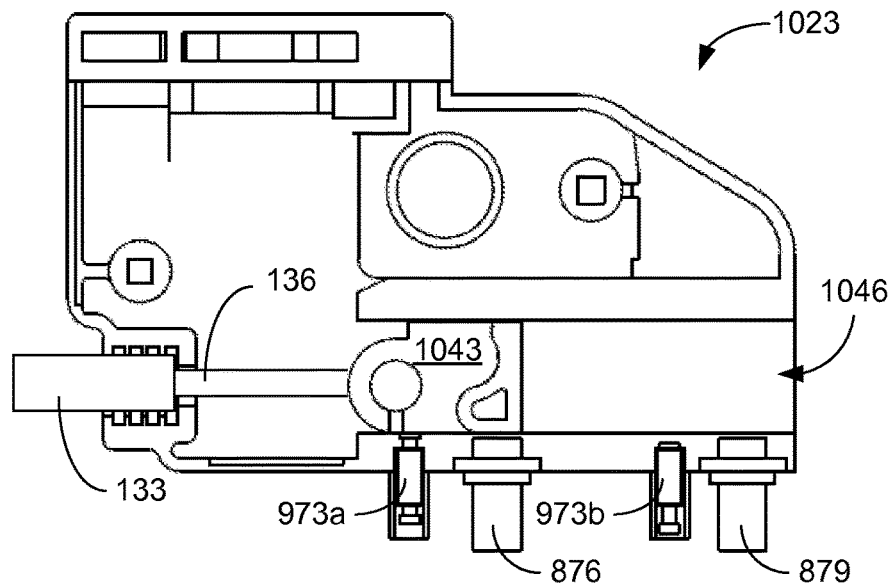
Figure 10B:
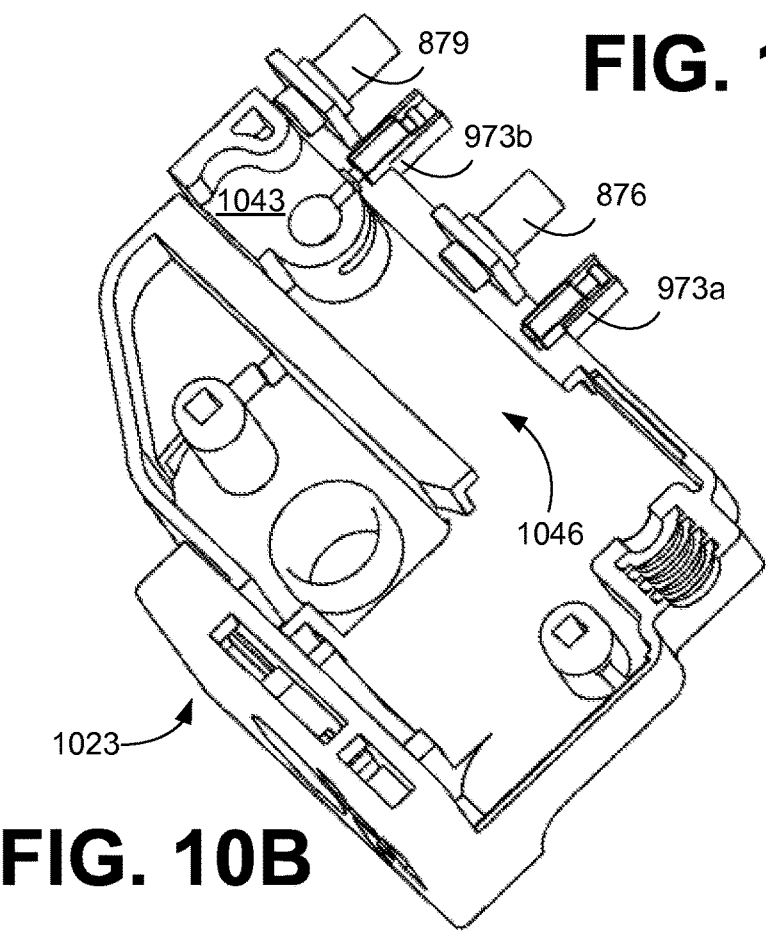

Other combinations of one or more position sensor(s) and one or more restraint mechanism(s) may also be used. For example, FIGS. 10A and 10B show cross-sectional views of an example of an actuation control box 1023 including the first and second sensors 876 and 870 of FIGS. 8A-8D and the first and second solenoid plungers 973a and 973b of FIGS. 9A-9D. In the embodiment of FIGS. 10A-10B, the solenoid plungers 973a and 973b extend to engage with the cable anchor 1043 to restrain movement in response to indications received from the position sensors 876 and 879. In the embodiment of FIG. 10A, as the cable anchor 1043 moves in the linear guide path 1046, a raised portion of the cable anchor 843 aligns with the first sensor 876 to indicate initiation of a quick flush. In response to the indication provided by the first position sensor 876, the restraint mechanism (e.g., the first solenoid plunger 973a) holds the cable anchor 1043 in the intermediate position, preventing the cable anchor 1043 from returning to the neutral position.

If a full flush is initiated, the cable anchor 1043 continues moving along the linear guide path 1046 further retracting the cable 136 into the actuation control box 1023. When the cable anchor 1043 reaches the full flush position, as illustrated in FIG. 10B, the raised portion of the cable anchor 1043 aligns with the second sensor 879 to indicate initiation of a full flush. In response to the indication provided by the second sensor 879, the flush control extends the time period to a time corresponding to a full flush of the toilet 100 and the second solenoid plunger 973b holds the cable anchor 1043 in the full flush position, preventing the cable anchor 1043 from returning to the neutral position.

Figure 11A:
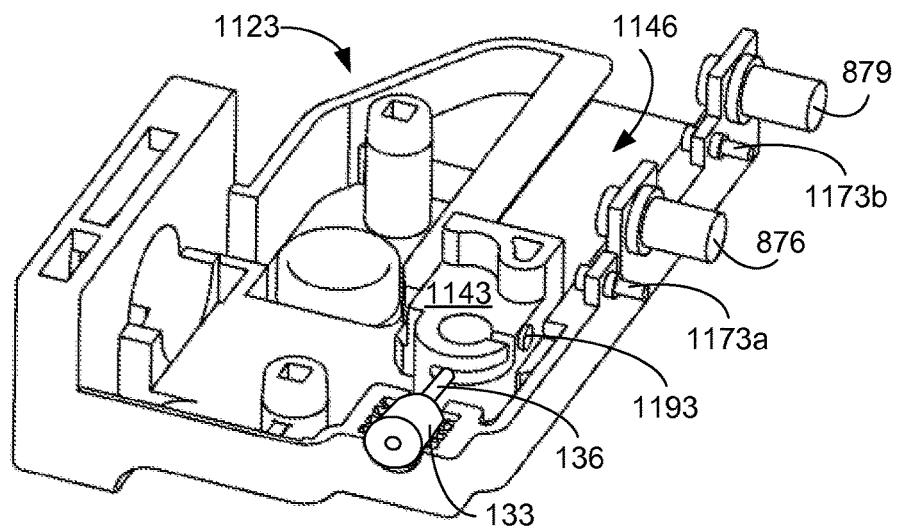
Figure 11B:
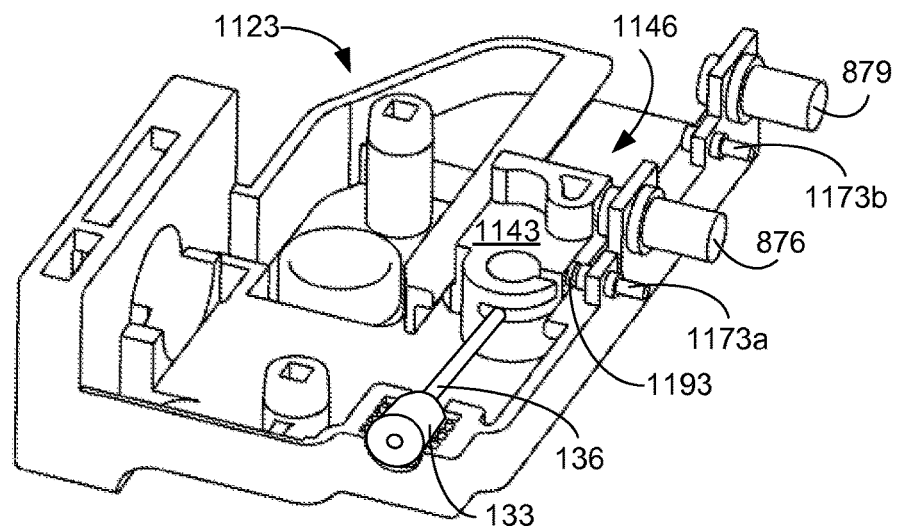
Figure 11C:
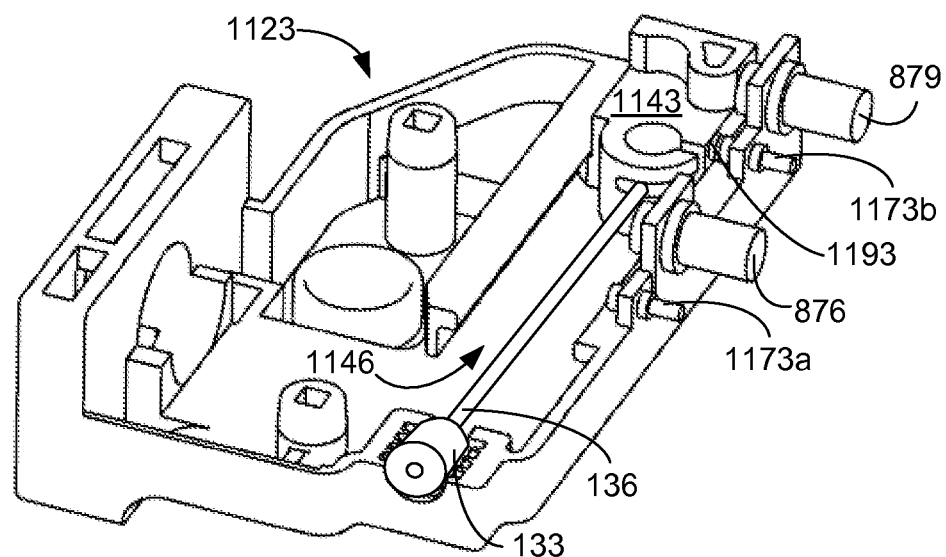

Referring next to FIGS. 11A-11C and 12A-12C, shown are examples of actuation control boxes with other restraint mechanisms that may be used to prevent the cable anchor from returning to a neutral position before completion of the flush cycle. In the embodiment of FIGS. 11A-11C, a piece of magnetic material 1193 such as, but not limited to, a permanent magnet or metal chip, is embedded in the side of the cable anchor 1143. As a flush is initiated, the cable anchor 1143 is moved along the linear guide path 1146 from the neutral position of FIG. 11A to the intermediate position of FIG. 11B. The first sensor 876 indicates initiation of a quick flush when the raised portion of the cable anchor 1143 aligns with the first sensor 876. In response to the indication provided by the first position sensor 876, the restraint mechanism (e.g., an electro-magnet 1173a) is activated to hold the cable anchor 1143 in the intermediate position, preventing the cable anchor 1143 from returning to the neutral position of FIG. 11A. The interaction between the electro-magnet 1173a and the magnet material 1193 holds the cable anchor 1143 in position until the quick flush is completed.

If a full flush is initiated, the cable anchor 1143 continues moving along the linear guide path 1146 further retracting the cable 136 into the actuation control box 1123. When the cable anchor 1143 reaches the full flush position, as illustrated in FIG. 11C, the raised portion of the cable anchor 1143 aligns with the second sensor 879 to indicate initiation of a full flush. In response to the indication provided by the second sensor 879, a second electro-magnet 1173b is energized to hold the cable anchor 1143 in the full flush position, preventing the cable anchor 1143 from returning to the neutral position until the full flush cycle is complete. If the flush control fails to operate the restraint mechanism (e.g., if the batteries cannot supply power), then the activation assembly 116 can be operated to manually flush the toilet 100 by depressing and holding a button of the push button assembly 119 or by holding the rotary handle assembly 219 in a rotated position for a desired period of time.

Figure 12A:
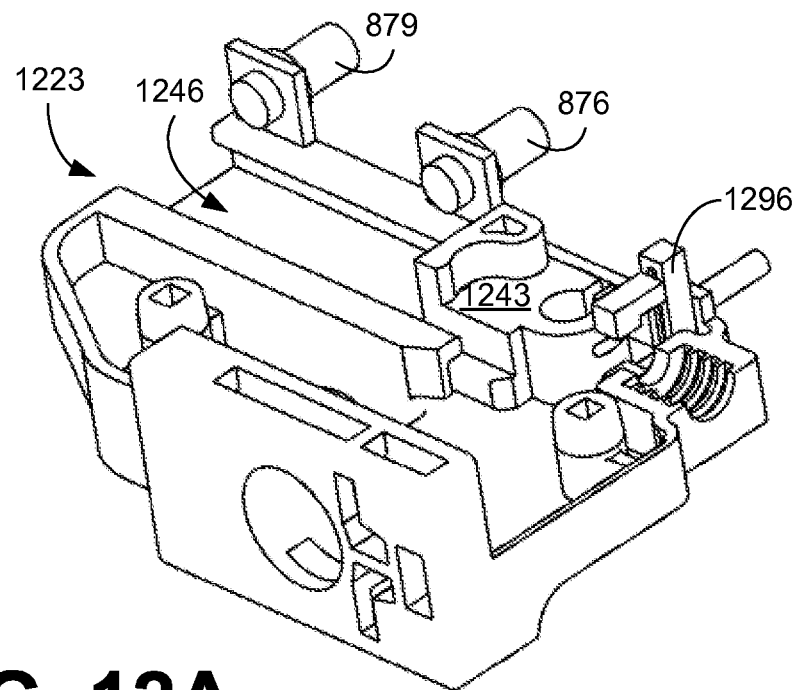
Figure 12B:
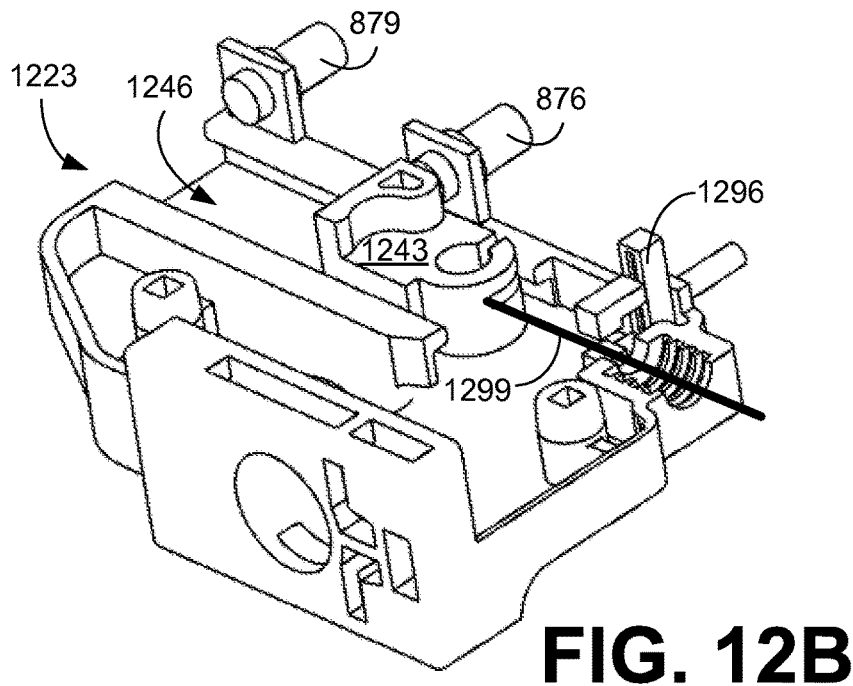
Figure 12C:
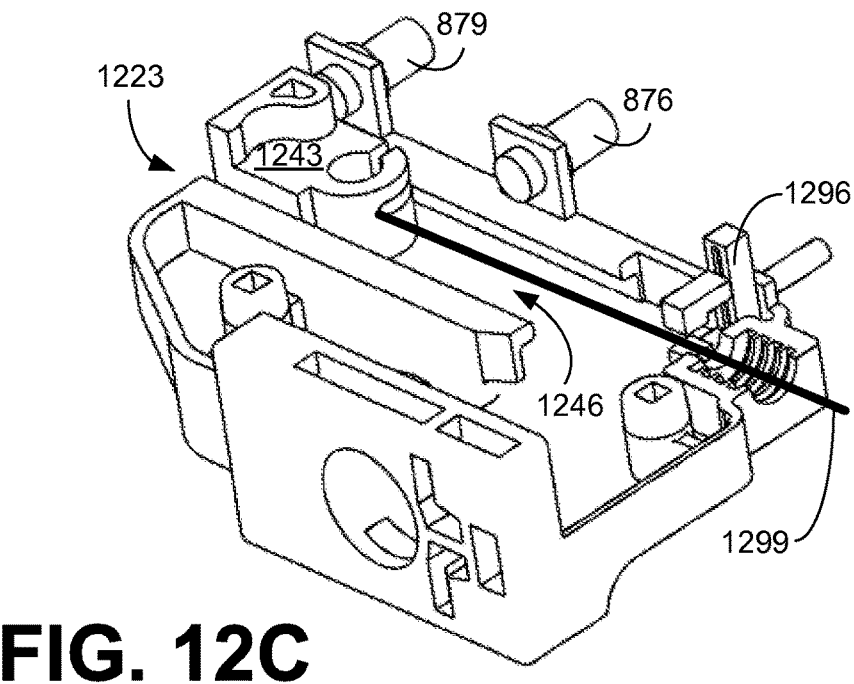

In the embodiment of FIGS. 12A-12C, a clamping device 1296 is used as the restraint mechanism. As a flush is initiated, the cable anchor 1243 is moved along the linear guide path 1246 from the neutral position of FIG. 12A to the intermediate position of FIG. 12B. The first sensor 876 indicates initiation of a quick flush when the raised portion of the cable anchor 1243 aligns with the first sensor 876. In response to the indication provided by the first position sensor 876, the restraint mechanism (e.g., the clamping device 1296) is activated to hold the cable anchor 1243 in the intermediate position, preventing the cable anchor 1243 from returning to the neutral position of FIG. 12A. In the embodiment of FIGS. 12A-12C, the clamping device 1296 pinches the cable 136 (indicated by line 1299 in FIGS. 12B and 12C) of the cable assembly 133 to hold the cable anchor 1243 in position until the quick flush is completed. The cable 136 may be held in place between a movable arm and a fixed arm. Movement of the movable arm can be electrically or mechanically controlled. In the embodiment of FIGS. 12A-12C, the upper arm is movable. In other embodiments, both arms may move to secure the cable 136 of the cable assembly 133. Alternative embodiments may use a clamping device that pushes or pulls on the cable 136 to prevent the cable anchor 1243 from returning to the neutral position. Such a clamping device may be extended or retracted by a solenoid to apply pressure to the cable 136.

If a full flush is initiated, the cable anchor 1243 continues moving along the linear guide path 1246 further retracting the cable 136 into the actuation control box 1223. When the cable anchor 1243 reaches the full flush position, as illustrated in FIG. 12C, the raised portion of the cable anchor 1243 aligns with the second sensor 879 to indicate initiation of a full flush. In response to the indication provided by the second sensor 879, the clamping device 1296 pinches the cable 136 to hold the cable anchor 1243 in the full flush position, preventing the cable anchor 1243 from returning to the neutral position until the full flush cycle is complete. The clamping device 1296 opens to release the cable 136 and allow the cable anchor 1243 to return to the neutral position of FIG. 12A when the flush cycle is complete. If the flush control fails to operate the restraint mechanism (e.g., if the batteries cannot supply power), then the activation assembly 116 can be operated to manually flush the toilet 100 by depressing and holding a button of the push button assembly 119 or by holding the rotary handle assembly 219 in a rotated position for a desired period of time.

Figure 13:
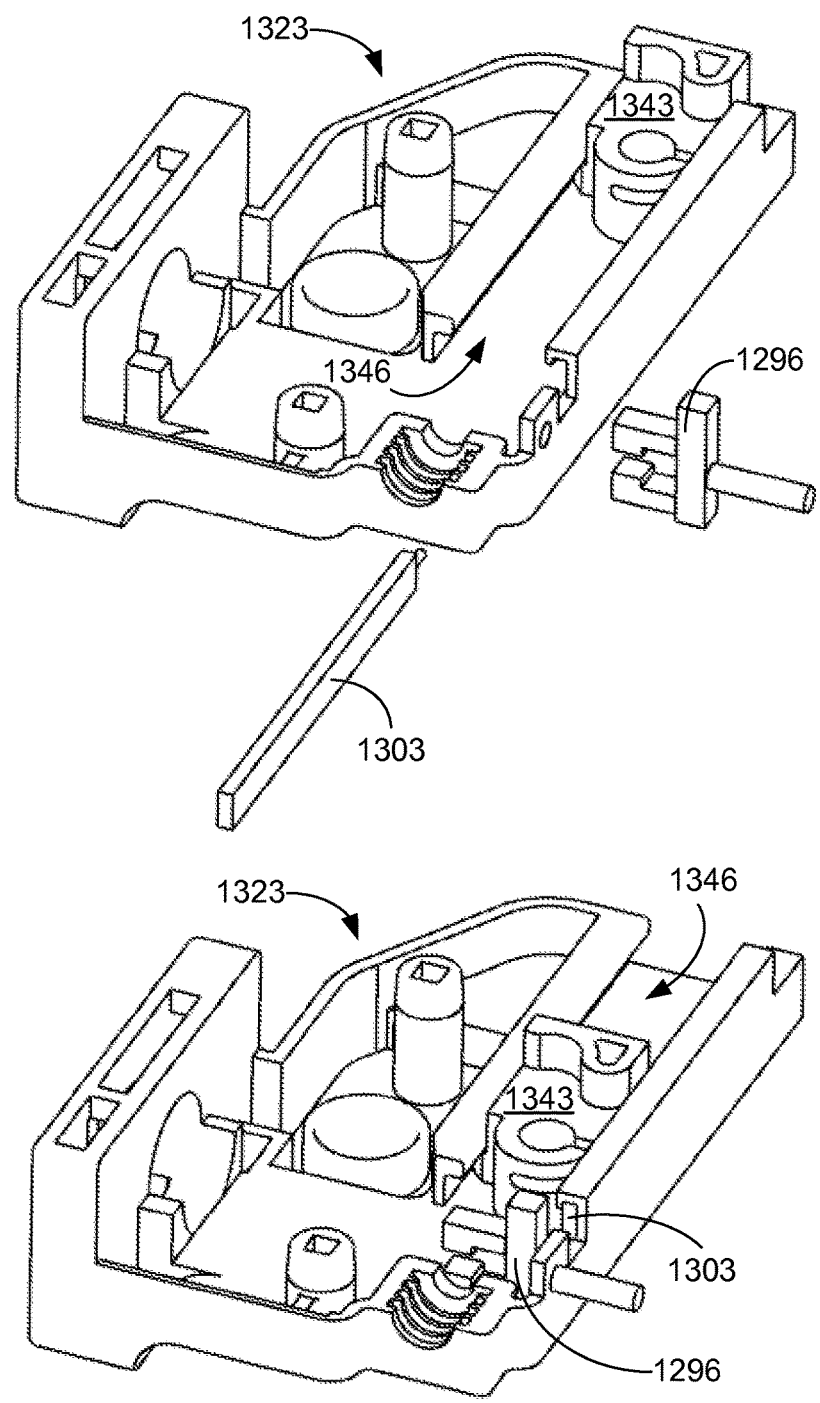

Referring next to FIG. 13, shown are exploded and assembled cross-section views of another example of an actuation control box 1323 including a continuous position sensor 1303. In the embodiment of FIG. 13, the continuous position sensor 1303 is mounted along one side of the linear guide path 1346. As the cable anchor 1343 moves along the linear guide path 1346, the continuous position sensor 1303 provides an indication of the cable anchor position. If the cable anchor 1343 reaches the intermediate position, the indication provided by the continuous position sensor 1303 causes the clamping device 1296 to pinch the cable 136 of the cable assembly 133 and hold the cable anchor 1343 in position until the quick flush is completed. If a full flush is initiated, the cable anchor 1343 continues moving along the linear guide path 1346 until the full flush position is reached. In response to the indication provided by the continuous position sensor 1303, the clamping device 1296 pinches the cable 136 to hold the cable anchor 1243 in place, preventing the cable anchor 1243 from returning to the neutral position until the full flush cycle is complete.

Figure 14A:
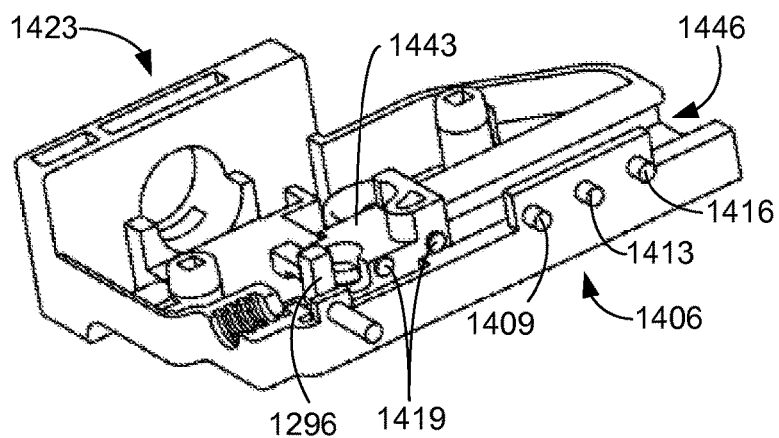

Referring next to FIGS. 14A-14D, shown are cross-section views of another example of an actuation control box 1423 including another position sensor 1406. In the embodiment of FIGS. 14A-14D, the position sensor 1406 includes a set of contacts 1409, 1413, and 1416 mounted along one side of the linear guide path 1446. As shown in FIG. 14A, the cable anchor 1443 includes contacts 1419 that are configured to contact the set of contacts 1409, 1413, and 1416. In the embodiment of FIGS. 14A-14D, the actuation control box 1423 also includes a clamping device 1296 as the restraint mechanism. Beginning with FIG. 14B, the activation assembly 116 is in a neutral position with the cable 136 retracted in cable assembly 133 and the cable anchor 1443 at a neutral position in the linear guide path 1446. In this condition, the sealing member 703 of the dual flush assembly 113 seals the flush orifice 706 of the dual flush assembly 113 as illustrated in FIG. 7A.

Using the activation assembly 116 to initiate a flush causes the cable anchor 1443 to move in the linear guide path 1446 to retract the cable 136 into the actuation control box 1423. Retraction of the cable 136 lifts the sealing member 703 to allow water to flow through the flush orifice 706 of FIGS. 7A and 7B. As the cable anchor 1443 reaches the intermediate position, as illustrated in FIG. 14C, the contacts 1419 on the cable anchor 1443 make contact with the first and second contacts 1409 and 1413 of the position sensor 1406. In the case where the cable anchor contacts 1419 are shorted together, contact with the first and second contacts 1409 and 1413 acts as if a switch has been closed to indicate initiation of a quick flush. In response to the indication provided by the position sensor 1406, the restraint mechanism (e.g., clamping device 1296) pinches the cable 136 to hold the cable anchor 1443 in the intermediate position, preventing the cable anchor 1443 from returning to the neutral position of FIG. 14B. As discussed with respect to FIG. 6B, the indication provided by the position sensor 1406 also initiates the timer of the flush control. When the quick flush time period has expired, the flush control allows the clamping device 1296 to open and release the cable 136. This allows the cable anchor 1443 to return to the neutral position of FIG. 14B and the sealing member 703 to reseal the flush orifice 706 as depicted in FIG. 7A, thereby ending the flush cycle of the toilet.

If a full flush is initiated, the cable anchor 1443 continues moving along the linear guide path 1446 further retracting the cable 136 into the actuation control box 1423 and lifting the sealing member 703 of the dual flush assembly 113 as illustrated in FIG. 7B. When the cable anchor 1443 reaches the full flush position, as illustrated in FIG. 14D, the cable anchor contacts 1419 make contact with the second and third contacts 1413 and 1416 of the position sensor 1406. In the case where the cable anchor contacts 1419 are shorted together, contact with the second and third contacts 1413 and 1416 acts as if a switch has been closed to indicate initiation of a full flush. In some embodiments, the second contact 1413 may act as a common connection for the position sensor.

Figure 14B:
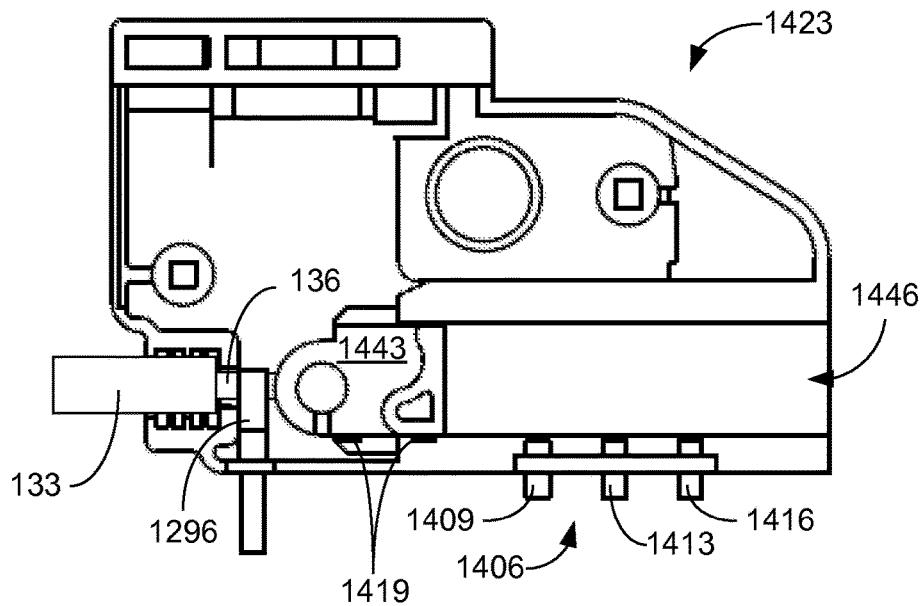
Figure 14C:
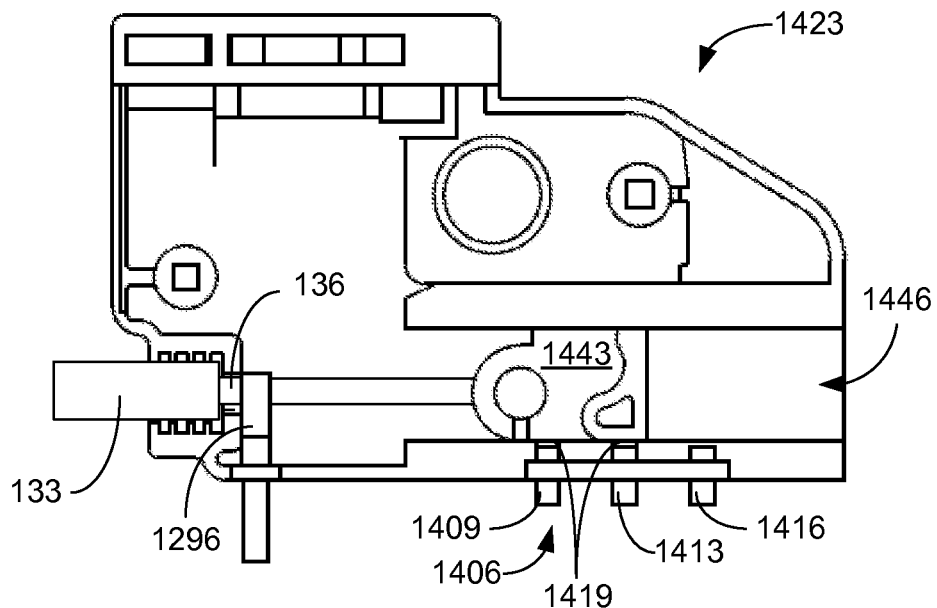
Figure 14D:
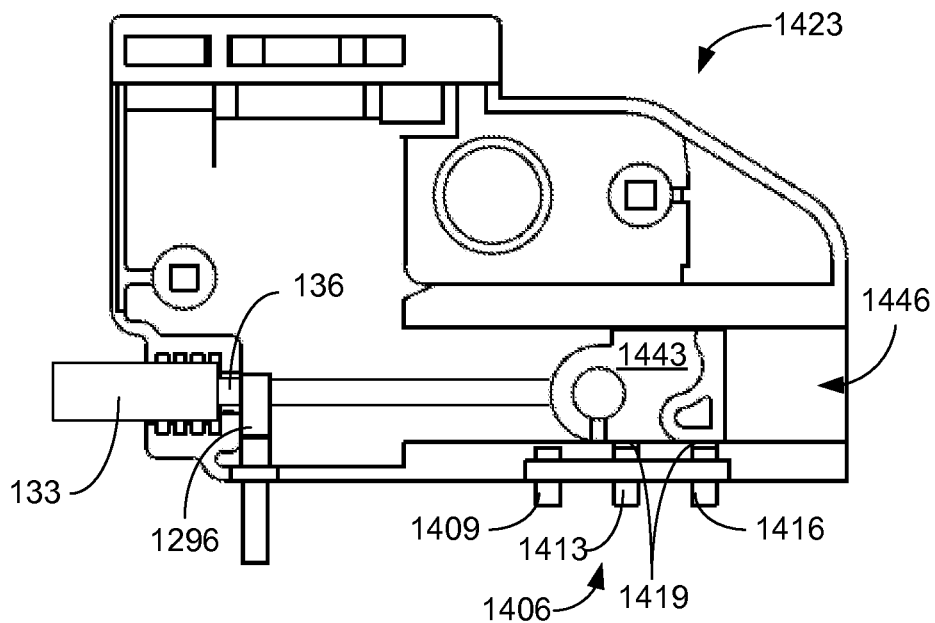

In response to the full flush indication provided by the position sensor 1406, the restraint mechanism (e.g., clamping device 1296) pinches the cable 136 to hold the cable anchor 1443 in the full flush position, preventing the cable anchor 1443 from returning to the neutral position of FIG. 14B. Also, in response to the second indication provided by the position sensor 1406, the flush control extends the time period to a time corresponding to a full flush of the toilet 100. When the extended time period has expired, the flush control allows the clamping device 1296 to open and release the cable 136 allowing the cable anchor 1443 to return to the neutral position of FIG. 14B and the sealing member 703 to reseal the flush orifice 706 as depicted in FIG. 7A, thereby ending the flush cycle of the toilet.

Figure 15A:
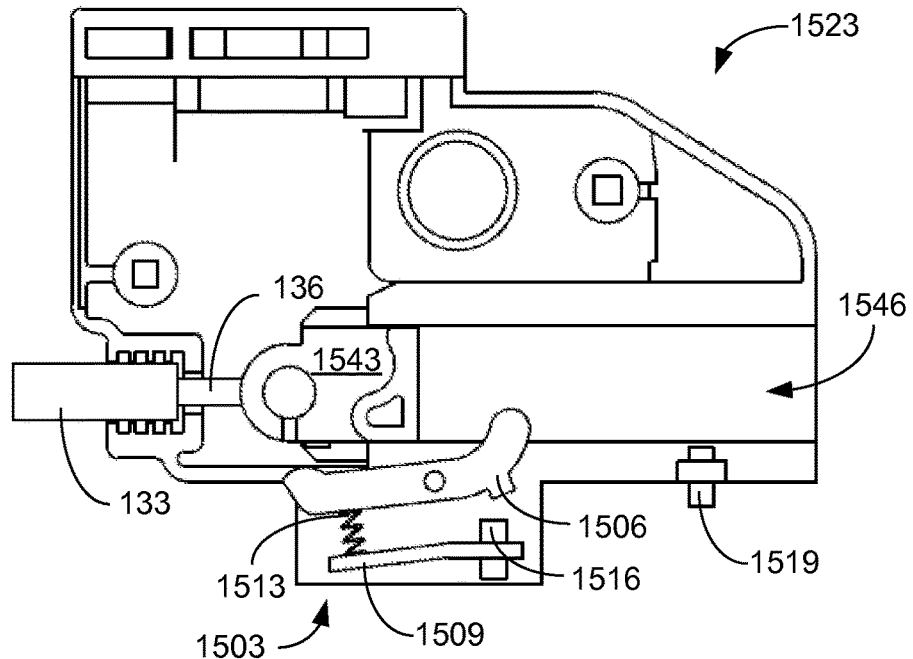
Figure 15B:
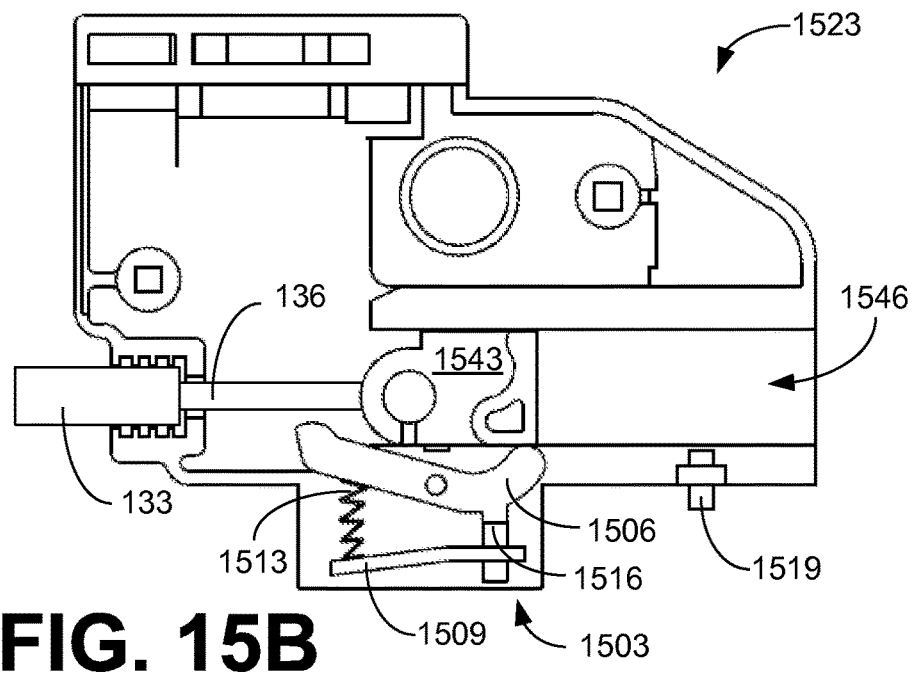
Figure 15C:
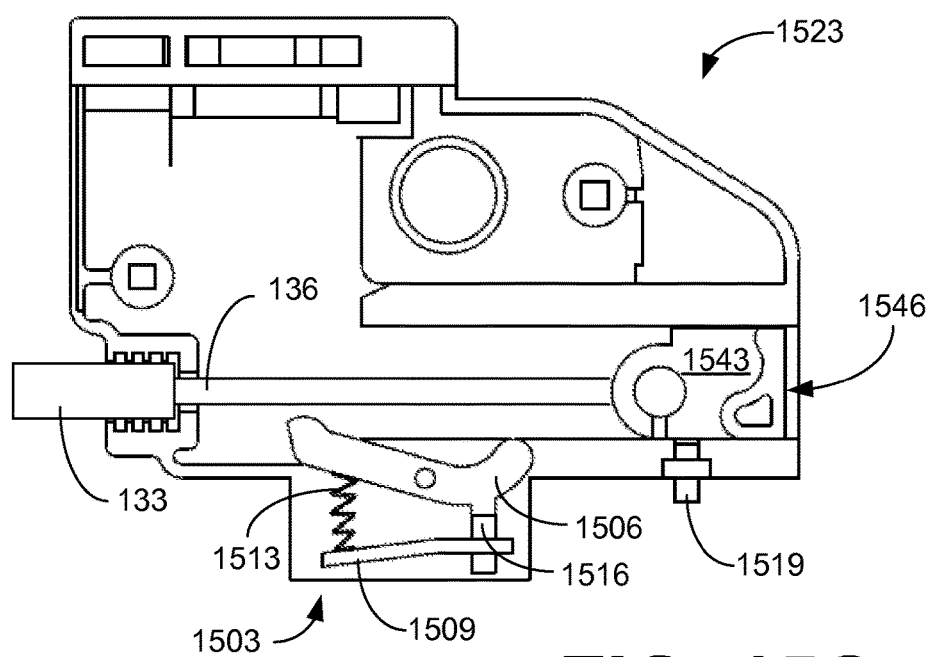

Referring now to FIGS. 15A-15C, shown are cross-section views of another example of an actuation control box 1523. In the embodiment of FIGS. 15A-15C, a locking assembly 1503 includes a locking arm 1506 and a retention plate 1509. Beginning with FIG. 15A, the activation assembly 116 is in a neutral position with the cable 136 retracted in cable assembly 133 and the cable anchor 1543 at a neutral position in the linear guide path 1546. With the cable anchor 1543 in the neutral position, a spring 1513 draws the locking arm 1506 away from the cable anchor 1543 to allow movement from the neutral position to an intermediate position within the linear guide path 1546.

Using the activation assembly 116 to initiate a flush causes the cable anchor 1543 to move in the linear guide path 1546 to retract the cable 136 into the actuation control box 1523. Retraction of the cable 136 lifts the sealing member 703 to allow water to flow through the flush orifice 706 of FIGS. 7A and 7B. As the cable anchor 1543 reaches the intermediate position, as illustrated in FIG. 15B, the cable anchor 1543 engages the locking arm 1506, causing it to pivot and make contact with contact 1516. Contact with contact 1516 indicates initiation of a quick flush and holds the locking arm 1506 in the pivoted position to prevent the cable anchor 1543 from returning to the neutral position of FIG. 15A. For example, the locking arm 1506 may be held in position magnetically or by other appropriate mechanical linkage. As discussed with respect to FIG. 6B, the indication provided by the contact 1506 also initiates the timer of the flush control. When the quick flush time period has expired, the flush control allows the spring 1513 to retract the locking arm 1506. This allows the cable anchor 1543 to return to the neutral position of FIG. 15A and the sealing member 703 to reseal the flush orifice 706 as depicted in FIG. 7A, thereby ending the flush cycle of the toilet.

If a full flush is initiated, the cable anchor 1543 continues moving along the linear guide path 1546 further retracting the cable 136 into the actuation control box 1523 and lifting the sealing member 703 of the dual flush assembly 113 as illustrated in FIG. 7B. When the cable anchor 1543 reaches the full flush position, as illustrated in FIG. 15C, a position sensor 1519 detects that position of the cable anchor 1543. The position sensor 1519 may be a micro-switch, a capacitive sensor, a magnetic sensor, or other appropriate type of sensor. In response to the indication provided by the sensor 1519, the flush control extends the time period to a time corresponding to a full flush of the toilet 100. Upon release of the button or rotary handle, the cable anchor 1543 is allowed to return to the intermediate position of FIG. 15B, but is restrained from returning to the neutral position for the period of time corresponding to a full flush of the toilet 100. When the extended time period has expired, the flush control allows the spring 1513 to retract the locking arm 1513, thereby allowing the cable anchor 1543 to return to the neutral position of FIG. 15A resealing the flush orifice 706 as depicted in FIG. 7A and ending the flush cycle.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. An apparatus, comprising:
a flush assembly; and
an activation assembly comprising an actuation control box configured to detachably attach to a flush button or a flush handle, where the activation assembly initiates a flush of the flush assembly based upon a position of the actuation control box, the actuation control box including:
a first position sensor that senses when the actuation control box transitions from a neutral position and reaches a first position corresponding to initiation of a quick flush of the flush assembly;
a second position sensor that senses when the actuation control box transitions from the first position and reaches a second position corresponding to initiation of a full flush of the flush assembly; and
a restraint mechanism configured to prevent the actuation control box from returning to the neutral position for a predefined period of time corresponding to a flush duration of the quick flush or the full flush of the flush assembly.

2. The apparatus of claim 1, wherein the first position sensor indicates initiation of the quick flush of the flush assembly when the actuation control box is in the first position.

3. The apparatus of claim 2, wherein the restraint mechanism prevents the actuation control box from returning to the neutral position in response to the indication from the first position sensor.

4. The apparatus of claim 2, wherein the second position sensor indicates initiation of the full flush of the flush assembly when the actuation control box is in the second position.

5. The apparatus of claim 4, wherein the predefined period of time is extended in response to the indication from the second position sensor.

6. The apparatus of claim 1, further comprising a flush control configured to control the operation of the restraint mechanism in response to an indication from the first or second position sensor.

7. The apparatus of claim 6, further comprising a flush control box including a power supply and circuitry for the flush control.

8. The apparatus of claim 7, wherein the flush control box includes a control for setting the predefined period of time corresponding to the flush duration of the flush assembly.

9. The apparatus of claim 6, wherein the flush control activates the restraint mechanism to prevent the actuation control box from returning to the neutral position in response to the indication from the first position sensor.

10. The apparatus of claim 9, wherein the flush control deactivates the restraint mechanism to allow the actuation control box to return to the neutral position based at least in part upon the predefined period of time.

11. The apparatus of claim 1, wherein the flush assembly is in communication with the actuation control box via a cable assembly comprising a cable and a cable sheath.

12. The apparatus of claim 11, wherein the actuation control box further comprises a cable anchor connected to the cable of the cable assembly, wherein the cable anchor moves along a linear guide path between the neutral position, the first position and the second position, wherein the first position sensor senses when the cable anchor reaches the first position and the second position sensor senses when the cable anchor reaches the second position, and the restraint mechanism prevents the cable anchor from returning to the neutral position for the predefined period of time.

13. The apparatus of claim 12, wherein the position sensor is a micro-switch.

14. The apparatus of claim 12, wherein the restraint mechanism is a plunger solenoid.

15. The apparatus of claim 12, wherein movement of the cable anchor from the neutral position lifts a sealing member from a flush orifice of the flush assembly.

16. The apparatus of claim 1, wherein the flush assembly is a dual flush assembly.

17. The apparatus of claim 1, wherein the flush assembly is a single flush assembly.

18. A flush activation assembly in communication with a flush assembly via a cable assembly, the flush activation assembly comprising:
an activation control box including:
a linear guide path;
a cable anchor connected to a cable of the cable assembly, where the cable anchor is constrained by and moves within the linear guide path between a neutral position and a first position;
a position sensor that provides an indication that the cable anchor has transitioned along the linear guide path from the neutral position and reached the first position adjacent to the position sensor, where movement of the cable anchor to the first position initiates a flush of the flush assembly; and
a restraint mechanism that prevents the cable anchor from returning to the neutral position along the linear guide path in response to the indication from the position sensor.

19. The flush activation assembly of claim 18, wherein the restraint mechanism prevents the cable anchor from returning to the neutral position for a predefined period of time corresponding to the flush duration of the flush assembly.

20. The flush activation assembly of claim 18, wherein the flush assembly is a dual flush assembly.

21. The flush activation assembly of claim 20, wherein a quick flush of the dual flush assembly is initiated when the cable anchor reaches the first position.

22. A flush activation assembly in communication with a dual flush assembly via a cable assembly, the flush activation assembly comprising:
an activation control box including:
a linear guide path;
a cable anchor connected to a cable of the cable assembly, where the cable anchor moves within the linear guide path between a neutral position and a first position;
a first position sensor that provides an indication that the cable anchor has transitioned from the neutral position and reached the first position adjacent to the first position sensor, where movement of the cable anchor to the first position initiates a quick flush of the flush assembly;
a second position sensor that provides an indication that the cable anchor has transitioned beyond the first position and reached a second position within the linear guide path, where movement of the cable anchor to the second position initiates a full flush of the dual flush assembly; and a restraint mechanism that prevents the cable anchor from returning to the neutral position along the linear guide path in response to the indication from the first position sensor.

23. The flush activation assembly of claim 22, wherein the predefined period of time is extended in response to the indication from the second position sensor.

24. The flush activation assembly of claim 22, further comprising a second restraint mechanism, where the restraint mechanism prevents the cable anchor from returning to the neutral position from the first position in response to the indication from the position sensor and the second restraint mechanism prevents the cable anchor from returning to the neutral position from the second position in response to the indication from the second position sensor.

25. The flush activation assembly of claim 18, wherein the flush assembly is a single flush assembly.

26. The flush activation assembly of claim 18, wherein a flush control activates the restraint mechanism to prevent the activation assembly from returning to the neutral position in response to the indication from the position sensor.

27. The flush activation assembly of claim 18, wherein the cable anchor is detachably connected to the cable.

\* \* \* \* \*